US006708889B2

(12) United States Patent
Ito et al.

(10) Patent No.: US 6,708,889 B2
(45) Date of Patent: Mar. 23, 2004

(54) BANK-NOTE PROCESSING DEVICE

(75) Inventors: Yukio Ito, Saitama (JP); Yasuyuki Kodama, Sakado (JP); Noboru Yamagishi, Tsurugashima (JP); Tadashi Hatamachi, Sakado (JP)

(73) Assignee: Kabushiki Kaisha Nippon Conlux, Tokyo (JP)

( * ) Notice: Subject to any disclaimer, the term of this patent is extended or adjusted under 35 U.S.C. 154(b) by 0 days.

(21) Appl. No.: 10/316,369

(22) Filed: Dec. 10, 2002

(65) Prior Publication Data

US 2003/0102368 A1 Jun. 5, 2003

Related U.S. Application Data

(62) Division of application No. 09/555,475, filed on May 31, 2000, now abandoned.

(30) Foreign Application Priority Data

Oct. 6, 1998 (JP) ...................................... 1998-284518

(51) Int. Cl.[7] ............................................... G06K 13/00

(52) U.S. Cl. ....................... 235/475; 235/375; 271/3.14

(58) Field of Search ................................ 235/379, 474, 235/475, 476, 477; 902/13, 14, 15; 209/534; 194/205, 206; 271/3.14, 3.01, 3.08, 145, 207

(56) References Cited

U.S. PATENT DOCUMENTS 3,924,847 A 12/1975 Pescetto .................... 271/3.14
4,858,744 A 8/1989 Dolejs et al. ............... 194/206
5,195,739 A 3/1993 Watabe ....................... 271/207
5,254,841 A 10/1993 Watabe et al. .............. 235/379
5,310,173 A 5/1994 Martinez .................... 271/198
5,564,691 A 10/1996 Hatamachi et al. ......... 271/178
5,605,214 A * 2/1997 Yukimoto et al. .......... 194/348
5,756,985 A 5/1998 Holste et al. ............... 235/475
6,119,936 A 9/2000 Claghorn et al. ........... 235/449

FOREIGN PATENT DOCUMENTS

WO WO 9962034 A1 * 12/1999 ............ G07D/9/00

* cited by examiner

*Primary Examiner*—Diane I. Lee
(74) *Attorney, Agent, or Firm*—Welsh & Katz, Ltd.

(57) ABSTRACT

A bank-note processing device (51), which prevents bank-notes received in a stacker from projecting into a bank-note transfer passage interfering with the next processing and which has a bank-note reverse-flowing preventive lever (80) that includes, at least, a first lever (25) turnably supported through a first shaft (26) and having a length smaller than the outer diameter (21*a*) of a bank-note guide drum (21), a first urging device (28) for constantly urging the first lever (25) toward a bank-note transfer passage (4), a first stop (32) for preventing the first lever (25) from rotating toward the bank-note transfer passage (4) through more than at a predetermined angel of rotation, a second lever (79) turnably supported on the front end (25*c*) of the first lever (25) through a second shaft (74), a second stop (76) for preventing the second lever (79) from rotating toward the bank-note transfer passage (4) through more than a predetermined angle of rotation, and a second urging device (77) for constantly urging the second lever (79) toward the bank-note transfer passage (4).

1 Claim, 25 Drawing Sheets

BANK-NOTE PROCESSING DEVICE

This application is a division of application Ser. No. 09/555,475, filed May 31, 2000, which is abandoned.

TECHNICAL FIELD

The present invention relates to a bank-note processing device used for e.g. a vending machine, a money changing machine, a pachinko ball dispenser and a metal token dispenser.

BACKGROUND ART

In a main unit of dispensers handling bank-notes (including coupons), a bank-note processing device for judging the genuineness of an inserted bank-note and for storing only bank-notes regarded as genuine is normally equipped.

FIG. 20 is a conceptual cross-sectional side view of a major portion of a conventional bank-note processing device 1.

This bank-note processing device 1 comprises a main body 2, and a stacker 37 which is disposed on the rear face 2*a* of the main body 2.

In the main body 2, an L-shaped bank-note transfer passage 4 connected to a bank-note slot 3, bank-note transporting means 11 for guiding a bank-note inserted from the bank-note slit 3 to the bank-note transfer passage 4, shutter means 18 for opening/closing the bank-note transfer passage 4, bank-note identification means 19 comprised of a magnetic head which judges the genuineness of the bank-note transported by the bank-note transporting means 11 after which the bank-note is passed through the shutter means 18, bank-note shifting means 20 for shifting the bank-notes judged as genuine by the bank-note identification means 19 to the stacker 37 side one by one, and a bank-note reverse-flowing preventive lever 30 for preventing the bank-notes stored in the stacker 37 by the bank-note shifting means 20 sticking out into the bank-note transfer passage 4, are disposed.

The L-shaped bank-note transfer passage 4 is comprised of a horizontal portion 4*a* which further comprises top and bottom chutes 5 and 6, and a vertical portion 4*b* which further comprises chutes 7 and 8, where the entire bottom chute 6 area of the horizontal portion 4*a* and upstream of the bottom chute 8 of the vertical portion 4*b* are integrated by a roughly L-shaped box 9, as disclosed in the description of Japanese Patent Application No. Hei 10-141350 which the present applicant proposed in the past. The box 9 is removably attached to the main body 2 in the arrow A direction as the dash and dotted lines in FIG. 21 show, via the slide support means, which is not illustrated, formed on both side faces of the box 9 and on both sides of the inner surface of the main body 2, which is for example, guide grooves and guide protrusions to be guided into the guide grooves. FIG. 21 is a conceptual plan view of a major portion depicting the operation of the conventional bank-note processing device, where the identical parts as FIG. 20 are denoted by the same numerals.

The bank-note transporting means 11 is comprised of a looped bank-note transporting belt 12, which is stretched along the horizontal portion 4*a* and the vertical portion 4*b* of the bank-note transfer passage 4, and belt driving means 17, which is further comprised of pulleys 13, 14, 15 and 16 for driving and rotating the bank-note transporting belt 12, as shown in FIG. 20.

The bank-note shifting means 20 is disposed on both sides of the main body 2 shown in FIG. 20 in the longitudinal direction, and is comprised of a pair of bank-note guide drums 21 which are supported so as to rotate in one direction with the top and bottom ends as shafts, as disclosed in the description of Japanese Patent Application No. Hei 5-276592, which the present applicant proposed in the past. On the cylindrical surface of the bank-note guide drum 21, a slit 22 for inserting the edge of a bank-note in the width direction is formed along the bank-note transfer passage 4, and this slit 22 is positioned to match the bank-note transfer passage 4 at the initial position, as shown in FIG. 22, which is a conceptual cross-sectional view of a major portion of the bank-note processing device. For details on the bank-note shifting means 20, refer to the description in Japanese Patent Application No. Hei 5-276592.

The bank-note reverse-flowing preventive lever 30 is disposed between the pair of bank-note guide drums 21, and is comprised of an L-shaped lever 25 which is rotatably supported with the shaft 26 as a center, and the lever 25 further comprises a long shaft 25*a* which is set to be a length shorter than the outer diameter 21*a* of the bank-note guide drums 21, and a short shaft 25*b* connected to urging means 28, which is further comprised of a spring 27 supported by a spring support section 31 disposed on the main body 2.

In the case of the long shaft 25*a*, the front end area 25*c* can freely come out of the hole 29 formed in the main body 2 toward the bank-note guide drum 21, and force is always exerted on the front end 25*e* toward the bank-note transfer passage 4 side by the urging means 28. For the short shaft 25*b*, a stop 32, for controlling the lever not to rotate for more than a predetermined angle toward the bank-note transfer passage 4 side, is formed at the front end 25*d*.

According to such a bank-note processing device 1, when a bank-note 101 (FIG. 22) is inserted into the bank-note slot 3, as shown in FIG. 20, the presence of the bank-note 101 is detected by the bank-note detection sensor, and the inserted bank-note 101 is horizontally transported to the right direction in the drawing along the horizontal portion 4*a* of the bank-note transfer passage 4 by the transporting force of the bank-note transporting belt 12 which rotates counterclockwise, that is normal rotation, based on the detection signal. At the same time, the shutter means 18 (FIG. 20) is driven, by which the shutter is moved to the left direction in the drawing and the vertical portion 4*b* of the bank-note transfer passage 4 is opened.

When the inserted bank-note 101 is horizontally transported to the right direction in the drawing along the horizontal portion 4*a* of the bank-note transfer passage 4 by the normal rotation of the bank-note transporting belt 12, and is then transported upward at roughly a 90 degree angle along the vertical portion 4*b* of the bank-note transfer passage 4, the genuineness of the inserted bank-note 101 is judged by the bank-note identification means 19 disposed at the vertical portion 4*b* of the bank-note transfer passage 4.

If the bank-note identification means 19 judges the inserted bank-note 101 as counterfeit, the bank-note transporting belt 12 rotates in reverse (clockwise rotation), so as to return the inserted bank-note 101 through the bank-note slot 3.

If the bank-note identification means 19 judges the inserted bank-note 101 as genuine, the bank-note transporting belt 12 continues normal rotation based on the detection signal, so as to transport the inserted bank-note 101 downstream of the bank-note transfer passage 4.

When the front end 101*a* of the inserted bank-note 101 is inserted into the bottom ends 22*a* of the slits 22 of the bank-note guide drums 21, the inserted bank-note 101 is caught between the edge of the slits of the bank-note guide drums 21 and the bank-note transporting belt 12 (FIG. 20), therefore the inserted bank-note 101 is transported to the arrow B direction in FIG. 22 along the slits 22 by the transporting force of the bank-note transporting belt 12.

When a sensor, not illustrated, detects that the bottom end 101*b* of the bank-note 101 has reached a predetermined position in the slits 22 of the bank-note guide drums 21, as shown in FIG. 23 where the identical parts as FIG. 22 are denoted by the same numerals, normal rotation of the bank-note transporting belt 12 (FIG. 20) stops and the bank-note guide drums 21 rotate in directions opposite from each other at a same phase, by which the bank-note 101 inserted in the slits 22 parallel shifts to the stacker 37 side, as the arrow C in FIG. 23 shows.

When the bank-note 101 parallel shifts to the stacker 37 side by the rotation of the bank-note guide drums 21, the bottom end 101*b* of the bank-note 101, which has a normal longitudinal dimension, contacts the long shaft 25*a* of the lever 25 and rotates the lever 25 with the shaft 26 as the center, as shown in FIG. 24, where the identical parts as FIG. 22 are denoted by the same numerals, therefore the lever 25 gradually moves into the hole 29, and the bank-note 101 parallel shifts to the stacker 37 side by the rotation of the bank-note guide drums 21.

When the bank-note 101 parallel shifts to the stacker 37 side by the rotation of the bank-note guide drums 21 and reaches the stacker 37, that is, when the slit 22 where the bank-note 101 is inserted, reaches the outer diameter 21*a* of the bank-note guide drums 21 by the rotation of the bank-note guide drums 21, the bank-note 101 is caught between the stacker plate, which is not illustrated, and the external surface of the bank-note guide drums 21 via the stack spring, which is not illustrated, and at the same time, the bank-note 101 is pushed by the chute 34 (FIG. 28), which constitutes the bank-note transfer passage 4 and shifts toward the stacker 37 side according to the rotation of the bank-note guide drums 21, and as a result, the bank-note 101 is released from the slits 22, and is stored in the stacker 37 without fail.

Since the length of the long shaft 25*a* of the lever 25 is set to be shorter than the outer diameter 21*a* of the bank-note guide drums 21, the bottom end 101*b* of the bank-note 101 leaves from the front end 25*e* of the long shaft 25*b* before the slit 22, where the bank-note 101 is inserted, reaches the outer diameter 21*a* of the bank-note guide drums 21 by the rotation of the bank-note guide drums 21, and the lever 25 returns to the initial position by the exerting force of the urging means 28, as shown in FIG. 25, where identical parts as FIG. 22 are denoted by the same numerals.

As a consequence, the inserted bank-note 101 is stacked and stored in the stacker 37 and the bottom end 101*b* engages with the bank-note reverse-flowing preventive lever 30, as shown in FIG. 26, where the identical parts as FIG. 22 are denoted by the same numerals, and this prevents the bank-note 101 stored in the stacker 37 from sticking out into the bank-note transfer passage 4 blocking transporting of the bank-note to be stored next.

Also in the conventional bank-note processing device 1, the stacker 37 is removably attached to the rear face 2*a* of the main body 2, as shown in FIG. 20, therefore the stacker 37 is separated from the main body 2 to collect the bank-notes stored in the stacker 37.

Also the box 9 of the bank-note processing device 1 is comprised of the entire bottom chute 6 area constituting the horizontal portion 4*a* of the bank-note transfer passage 4 and upstream of the bottom chute 8 constituting the vertical portion 4*b*, which are integrated, and is removably attached to the main body 2 in the arrow A direction via the above mentioned slide support means as shown in FIG. 20 and FIG. 21, so when a maintenance, inspection and cleaning of the bank-note transporting means 11, shutter means 18 or bank-note identification means 19 is performed, the operator slides the box 9 to the opposite side of the main body 2 via the above slide support means while holding the box 9 so as to separate the box 9 from the main body 2, after which maintenance, inspection and cleaning are performed.

According to the above mentioned conventional bank-note processing device 1, the length of the long shaft 25*a* of the lever 25 is set to be shorter than the outer diameter 21*a* of the bank-note guide drums 21, as shown in FIG. 25, however, the longitudinal dimension of the bank-notes vary, and if a bank-note whose longitudinal dimension is short is inserted and this bank-note is stored in the stacker 37, the bank-note 102 does not engage with the front end 25*c* of the bank-note reverse-flowing preventive lever 30, and is pushed by other bank-notes already stored in the stacker 37 or by the stacker plate, not illustrated, and as a result, the roughly center part 102*c* in the width direction sticks out into the bank-note transfer passage 4, and the bank-note 102 once stored in the stacker 37 may interfere in transporting a bank-note to be stored next, as shown in FIG. 27 and in FIG. 28, which is a conceptual top view of FIG. 27.

In particular, since the bank-notes 102 stored in the stacker 37 tend to swell toward the bank-note transfer passage 4 side by air which enters into the center area 102*c* in the width direction, the above concern is more serious.

Also according to the above mentioned conventional bank-note processing device 1, the stacker 37 is removably attached to the main body 2 and stores the bank-note 101 transported from the main body 2 as shown in FIG. 20, therefore if the stacker 37 is separated from the main body 2 to collect the bank-notes stored in the stacker 37, the bank-notes 101 stored in the stacker 37 tend to drop through the opening of the stacker 37 which is formed directly toward the rear face 2*a* of the main body 2.

Also according to the above mentioned conventional bank-note processing device 1, the box 9 is comprised of the entire bottom chute 6 area constituting the horizontal portion 4*a* of the bank-note transfer passage 4 and upstream of the bottom chute 8 constituting the vertical portion 4*b*, which are integrated, and is removably attached to the main body 2 in the arrow A direction via the slide support means, as shown in FIG. 21. So in order to perform maintenance, inspection and cleaning of the bank-note transporting means 11 or the bank-note identification means 19, the operator slides the box 9 to the opposite side of the main body 2 via the slide support means while holding the box 9, and after separating the box 9 from the main body 2 in this way, maintenance, inspection and cleaning is performed.

This means that during maintenance, inspection and cleaning operation of the bank-note transporting means 11 or bank-note identification means 19, the box 9 must be held and maintenance, inspection and cleaning operation must be performed with one hand, which makes the operation troublesome.

With the foregoing in view, it is an object of the present invention to provide a bank-note processing device which can prevent a bank-note stored in the stacker from sticking out into the bank-note transfer passage and interfering in the processing of the bank-note to be transported next as much as possible.

It is a second object to provide a bank-note processing device which can prevent a bank-note stored in the stacker from sticking out into the bank-note transfer passage and interfering in the processing of the bank-note to be transported next as much as possible, and can prevent the drop of bank-notes stored in the stacker during bank-note collection as much as possible.

It is a third object to provide a bank-note processing device which simplifies the maintenance, inspection and cleaning of various equipment disposed on the bank-note transfer passage, and improves the work efficiency.

DISCLOSURE OF THE INVENTION

To achieve the first object, a first aspect of the present invention is a bank-note processing device comprising: bank-note transporting means for transporting a bank-note inserted from a bank-note slot along a bank-note transfer passage; bank-note shifting means having a pair of bank-note guide drums where slits for inserting both ends in the width direction of the bank-note transported by the bank-note transporting means along the longitudinal direction of the bank-note so as to shift the bank-note inserted in the slits to a stacker side by rotating the pair of bank-note guide drums in directions opposite from each other at a same phase; and a bank-note reverse-flowing preventive lever which is disposed between the pair of bank-note guide drums for preventing the bank-note stored in the stacker from sticking out into the bank-note transfer passage, characterized in that the bank-note reverse-flowing preventive lever further comprises: a first lever which is rotatably supported via a first shaft and is shorter than the outer diameter of the bank-note guide drums; a first urging means for constantly exerting force on the first lever toward the bank-note transfer passage side; a first stop for controlling the first lever not to rotate the first lever more than at a predetermined rotation angle toward the bank-note transfer passage side; a second lever which is rotatably supported at the front end of the first lever via a second shaft; a second stop for controlling the second lever not to rotate more than at a predetermined rotation angle toward the bank-note transfer passage side; and a second urging means for constantly exerting force on the second lever toward the bank-note transfer passage side.

To achieve the second object, a second aspect of the present invention is a bank-note processing device comprising: a main body comprised of a bank-note transporting means for transporting a bank-note inserted from a bank-note slot along a bank-note transfer passage, and bank-note shifting means having a pair of bank-note guide drums where slits for inserting both ends in the width direction of the bank-note transported by the bank-note transporting means along the longitudinal direction of the bank-note so as to shift the bank-note inserted in the slots to the rear face by rotating the pair of bank-note guide drums in directions opposite from each other at a same phase; a stacker which is removably attached to the rear face of the main body so as to store the bank-notes inside via the bank-note shifting means; and a bank-note reverse-flowing preventive lever which is disposed between the pair of bank-note guide drums for preventing the bank-note stored in the stacker from sticking out into the bank-note transfer passage when the stacker is attached to the main body, characterized in that the bank-note reverse-flowing preventive lever is disposed in the stacker, so that when the stacker is separated from the main body, the bank-note reverse-flowing preventive lever prevents the bank-note stored in the stacker from dropping out of the stacker.

To achieve the third object, a third aspect of the present invention is a bank-note processing device comprising: a main body comprised of bank-note transporting means for guiding a bank-note inserted from a bank-note slot to a bank-note transfer passage, and bank-note identification means for judging the genuineness of the bank-note passes through the bank-note transporting means; and a box which constitutes a part of the bank-note transfer passage and is removably attached to the main body via attachment/removal means, characterized in that the attachment/removal means further comprises: a guide groove which is formed on both sides of the inner surface of the main body; a guide protrusion which is formed on both side faces of the box and is guided into the guide groove; a guide protrusion escape hole which is formed just before the end of the guide groove directed to the upper part of the guide groove; and a guide protrusion support hole, which is formed on both side faces of the main body and at the end of the guide groove, where the box is slidably attached to the main body when the guide protrusions are inserted into the guide grooves via the guide protrusion escape holes, and is rotatably supported from the main body when the guide protrusions are inserted in the guide protrusion support holes, so that the box can be separated from the main body by escaping the guide protrusions from the guide grooves via the protrusion escape holes.

BEST MODE FOR CARRYING OUT THE INVENTION

An embodiment of a bank-note processing device in accordance with the present invention will now be described in detail.

Figure 1:
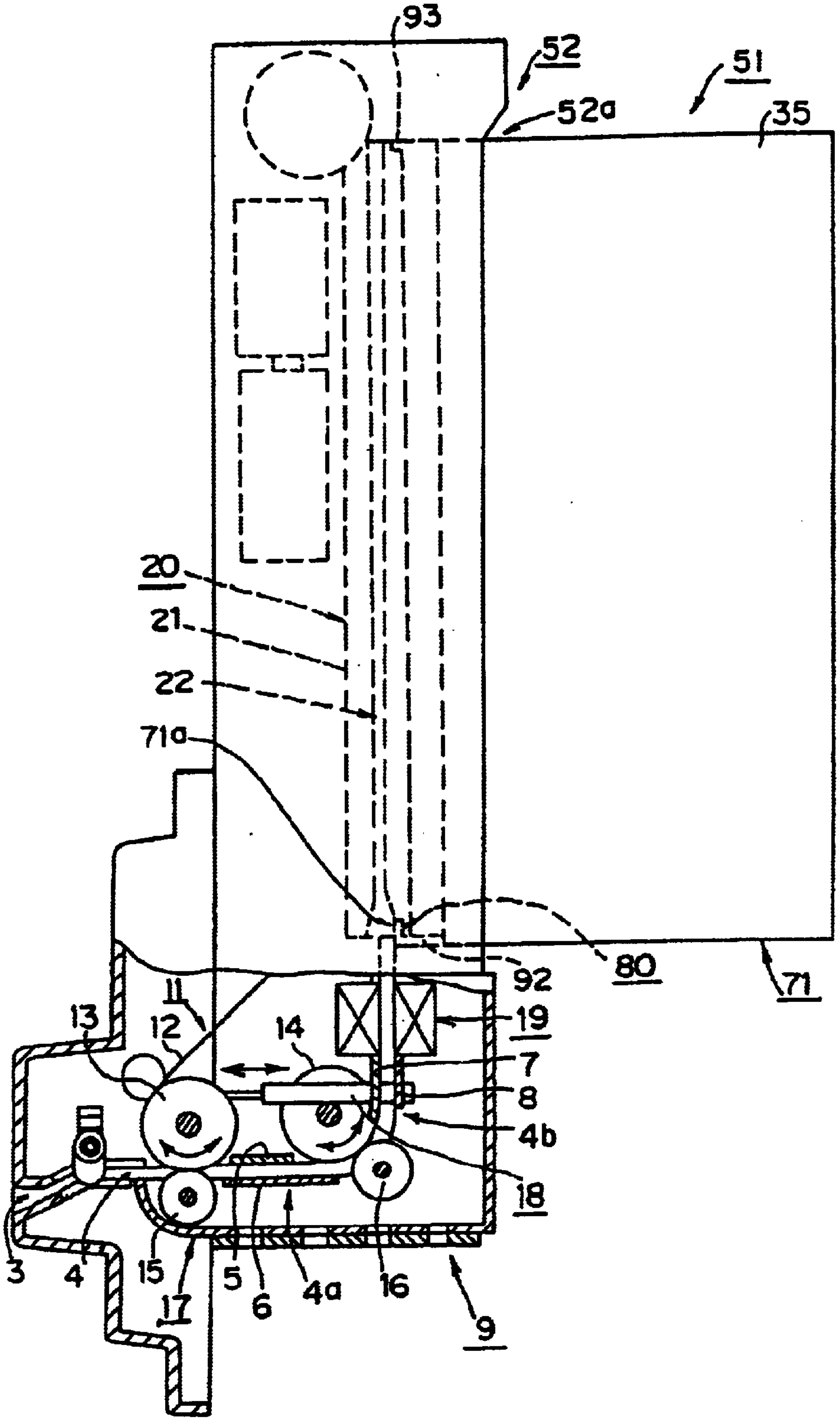
FIG. 1 is a conceptual cross-sectional side view of a major portion of a bank-note processing device in accordance with the present invention.
Figure 20:
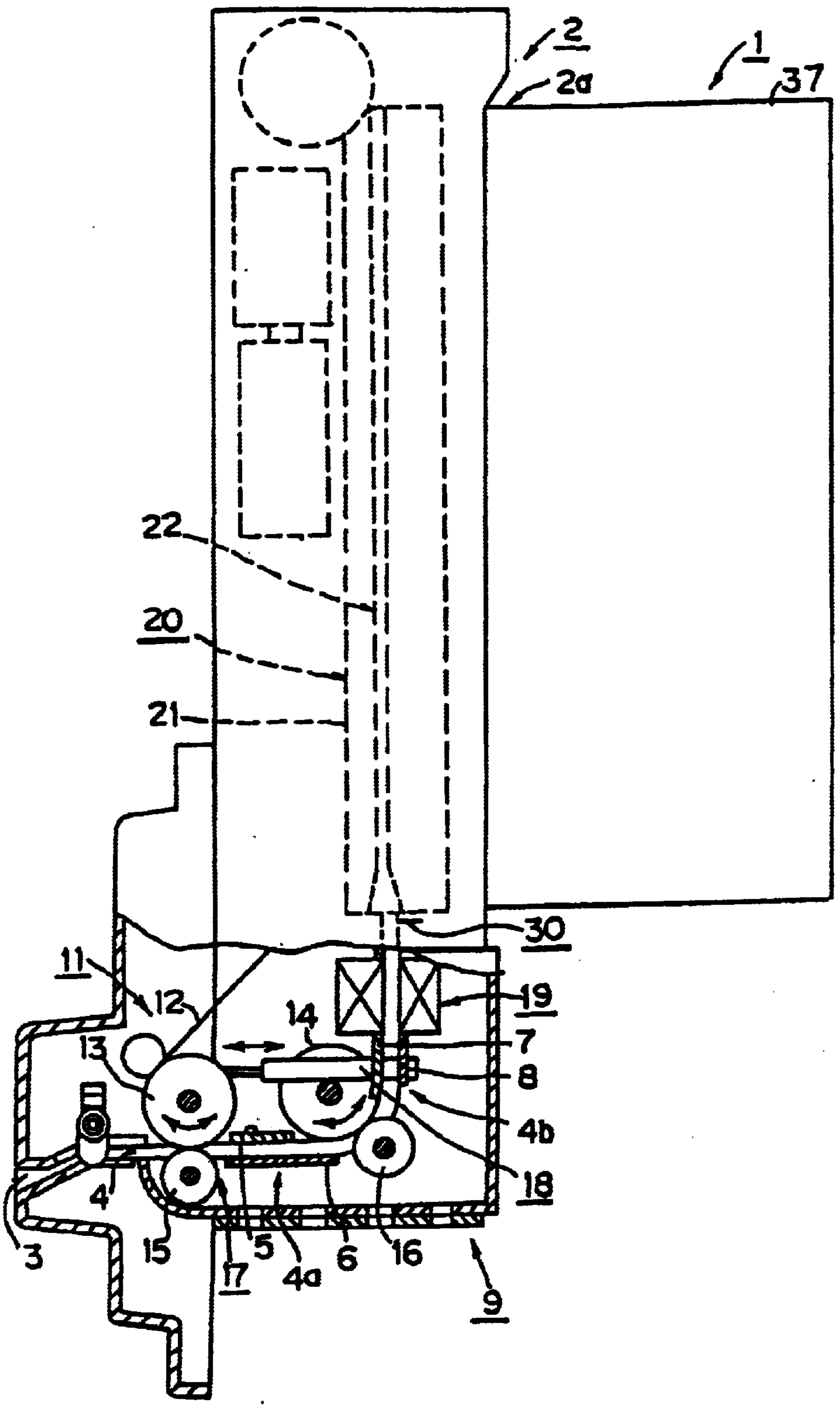
FIG. 20 is a conceptual cross-sectional side view of a major portion of a conventional bank-note processing device.
Figure 21:
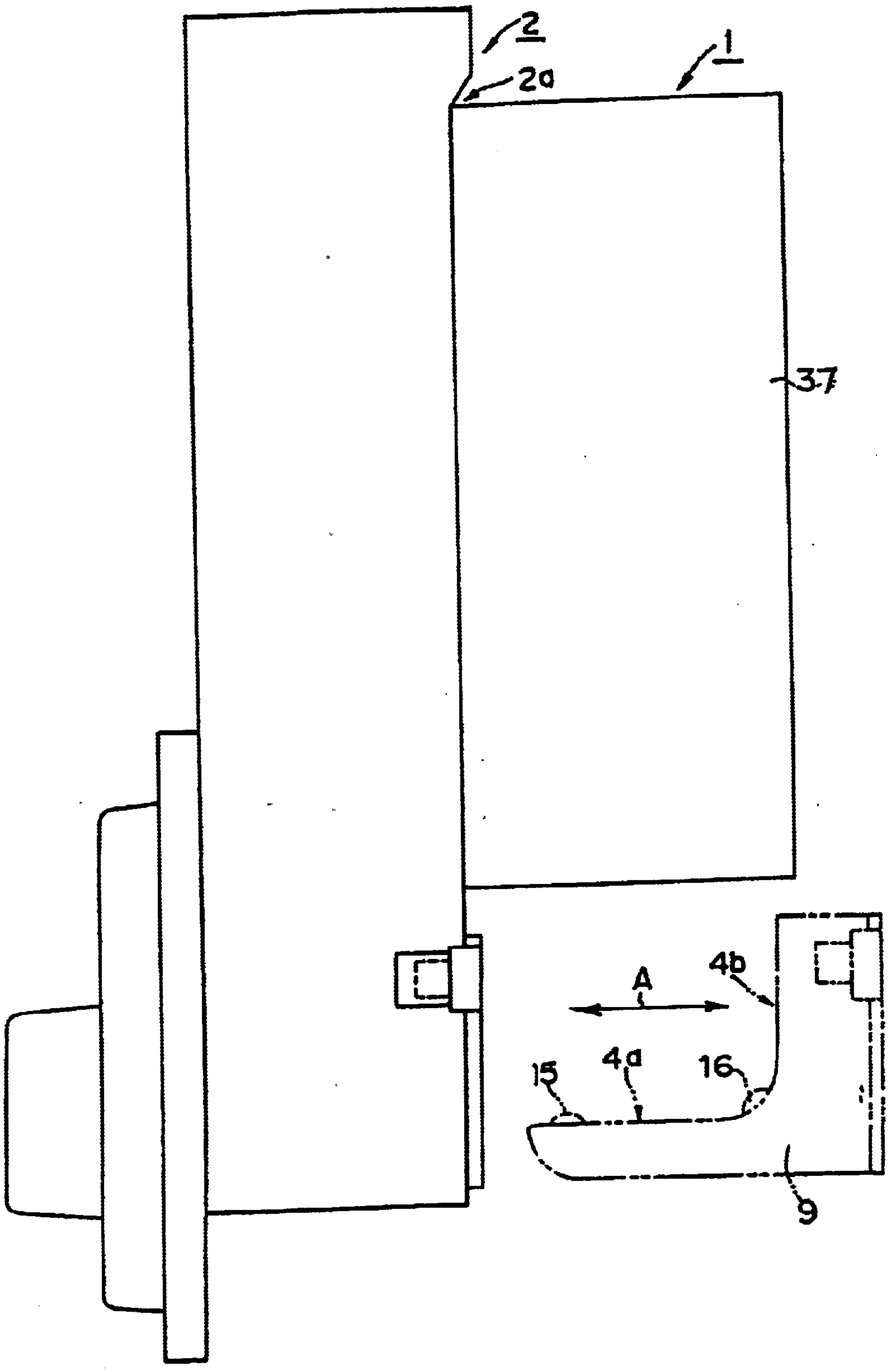
FIG. 21 is a conceptual plan view of a major portion depicting the attachment/removal operation of a box constituting the conventional bank-note processing device.

FIG. 1 is a conceptual cross-sectional side view of a major portion of a bank-note processing device in accordance with the present invention, where identical parts as FIG. 20 are denoted by the same numerals.

Compared with the conventional bank-note processing device, the structure of this bank-note processing device in accordance with the present invention is completely different in the following three aspects.

(1) Structure of the bank-note reverse-flowing preventive lever (the portion related to the first aspect of the present invention).

(2) Structure of the stored bank-note dropping prevention means for preventing the bank-notes stored in the stacker from dropping from the lower part of the stacker when the stacker is separated from the main unit (the portion related to the second aspect of the present invention).

(3) The structure of the attachment/removal means of the box to be removably attached to the main body (the portion related to the third aspect of the present invention).

The structures stated in (1) to (3) will now be described in detail, beginning with (1) structure of the bank-note reverse-flowing preventive lever in accordance with the first aspect of the present invention.

This bank-note processing device 51 comprises a rectangular main body 52 and a stacker 71 which is removably attached to the rear face 52*a* of the main body 52.

In the main body 52, the L-shaped bank-note transfer passage 4 connected to the bank-note slot 3, the bank-note transporting means 11 for guiding the bank-note inserted from the bank-note slot 3 to the bank-note transfer passage 4, the shutter means 18 for opening/closing the bank-note transfer passage 4, the bank-note identification means 19 comprised of a magnetic head and other parts for judging the genuineness of the bank-note after the bank-note is transported by the bank-note transporting means 11 and is passed through the shutter means 18, and the bank-note shifting means 20 for moving the bank-notes judged as genuine by the bank-note identification means 19 to the stacker 71 side one by one, are disposed.

Of this, the bank-note transporting means 11 comprises a looped bank-note transporting belt 12 which is stretched along the horizontal portion 4*a* and the vertical portion 4*b* of the bank-note transfer passage 4, and the bank-note transporting belt driving means 17 which further comprises pulleys 13, 14, 15 and 16 for driving and rotating the bank-note transporting belt 12, just like the prior art.

The stacker 71, on the other hand, comprises a body 35 corresponding to the conventional stacker 37 (FIG. 20) and the bank-note reverse-flowing preventive lever 80 which is disposed in the body 35 and prevents bank-notes once stored in the stacker 71 from sticking out into the bank-note transfer passage 4.

Figure 2:
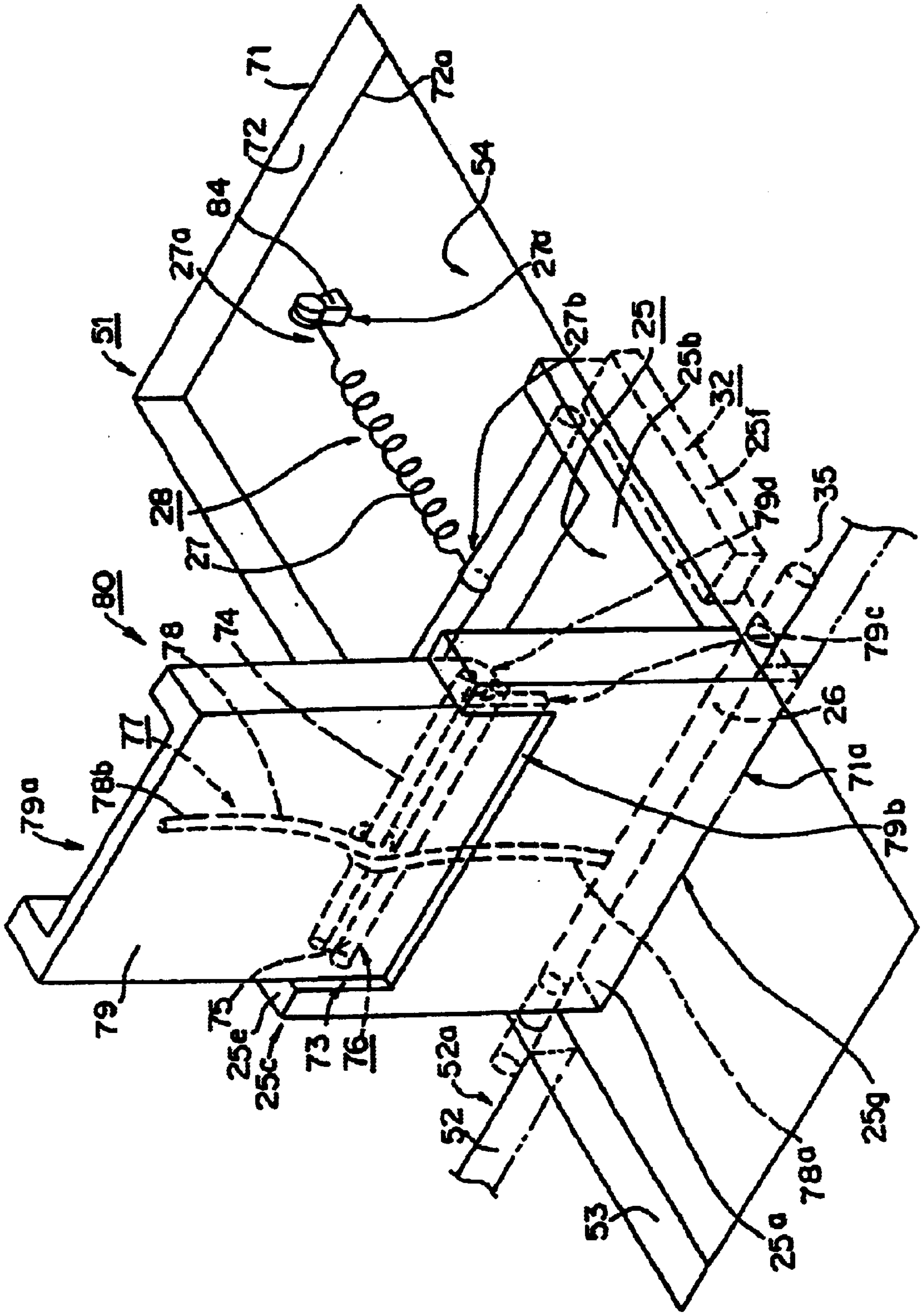
FIG. 2 is a conceptual perspective view of a major portion of the bank-note processing device in accordance with the present invention.

The bank-note reverse-flowing preventive lever 80 is disposed in the notch 72 formed in the front face 71*a* of the stacker 71, shown in FIG. 2, and is comprised of a first lever 25 which corresponds to the above mentioned lever, a first urging means 28 which corresponds to the above mentioned urging means, a first stop 32 which corresponds to the above mentioned stop a second lever 79, a second urging means 77, and a second stop 76. FIG. 2 is a conceptual perspective view of a major portion of the bank-note processing device, where the parts having the same functions as FIG. 1 are denoted by the same numerals. As FIG. 2 shows, the notch 72 formed on the stacker 71 contacts the notch 53 formed on the rear face 52*a* of the main body 52 and forms a hole 54 when the stacker 71 is attached to the main body 52.

The first lever 25 is an L-shaped lever disposed between the pair of bank-note guide drums 21 (FIG. 1), and this first lever 25 is comprised of a long shaft which length is set to be shorter than the outer diameter 21*a* of the bank-note guide drums 21 (FIG. 1), and a short shaft 25*b* where a protruding section 25*f*, which contacts the bottom face 72*a* of the notch 72 formed on the stacker 71, is disposed. The bent part 25*g* of the first lever 25 is inserted into the first shaft 26 which is inserted into both ends of the notch 72. The protruding section 25*f* formed on the short shaft 25*b* constitutes the first stop 32.

At the front end 25*c* of the long shaft 25*a* of the first lever 25, a notch 73 directed upward is formed and the second shaft 74 passes through roughly at the center of the notch 73. Also in the notch 73, the shaft 75 constituting the second stop 76 passes through at a location slightly below the second shaft 74 toward the bank-note transfer passage 4 side.

The first urging means 28 is comprised of a spring 27 where one end 27*a* is supported by a spring support section 84 disposed in the stacker 71 and the other end 27*b* is connected to the short shaft 25*b* of the first lever 25.

The rear end 79*b* of the second lever 79 is comprised of a piece 79*c* which is formed at the bank-note transfer passage 4 (FIG. 1) side, and a shaft support section 79*b* having a cross-section of roughly an arc shape, where the second shaft 74 is inserted, and the entire rear end 79*b* is inserted into the notch 73 of the first lever 25.

The second urging means 77 is comprised of a spring 78 where one end 78*a* loops the second shaft 74 and is connected to the long shaft 25*a* of the first lever 25 and the other end 78*b* is connected to the second lever 79.

In the bank-note reverse-flowing preventive lever 80 structured in this manner, the first lever 25 is rotatably supported with the first shaft 26 as the center, and force is constantly exerted on the first lever 25 to the bank-note transfer passage 4 side by the first urging means 28. The rotation of the first lever 25 toward the bank-note transfer passage 4 side is controlled to be less than at a predetermined rotation angle by the protruding section 25*f* formed on the first lever 25 contacting the bottom face 72*a* of the notch 72. The second lever 79 is rotatably supported with the second shaft 74 as the center and force is constantly exerted on the second lever 79 to the bank-note transfer passage 4 side by the second urging means 77. The rotation of the second lever 79 is controlled to be less than at a predetermined rotation angle by the piece 79*c* contacting the shaft 75.

Operation of the above mentioned bank-note processing device 51 will now be explained.

Since the bank-note transfer passage 4, the bank-note transporting means 11, the shutter means 18 and the bank-note identification means 19 of the bank-note processing device 51 perform operations the same as the prior art, operation after insertion of the bank-note judged as genuine into the slits 22 of the bank-note guide drums 21 will be described here.

Figure 3:
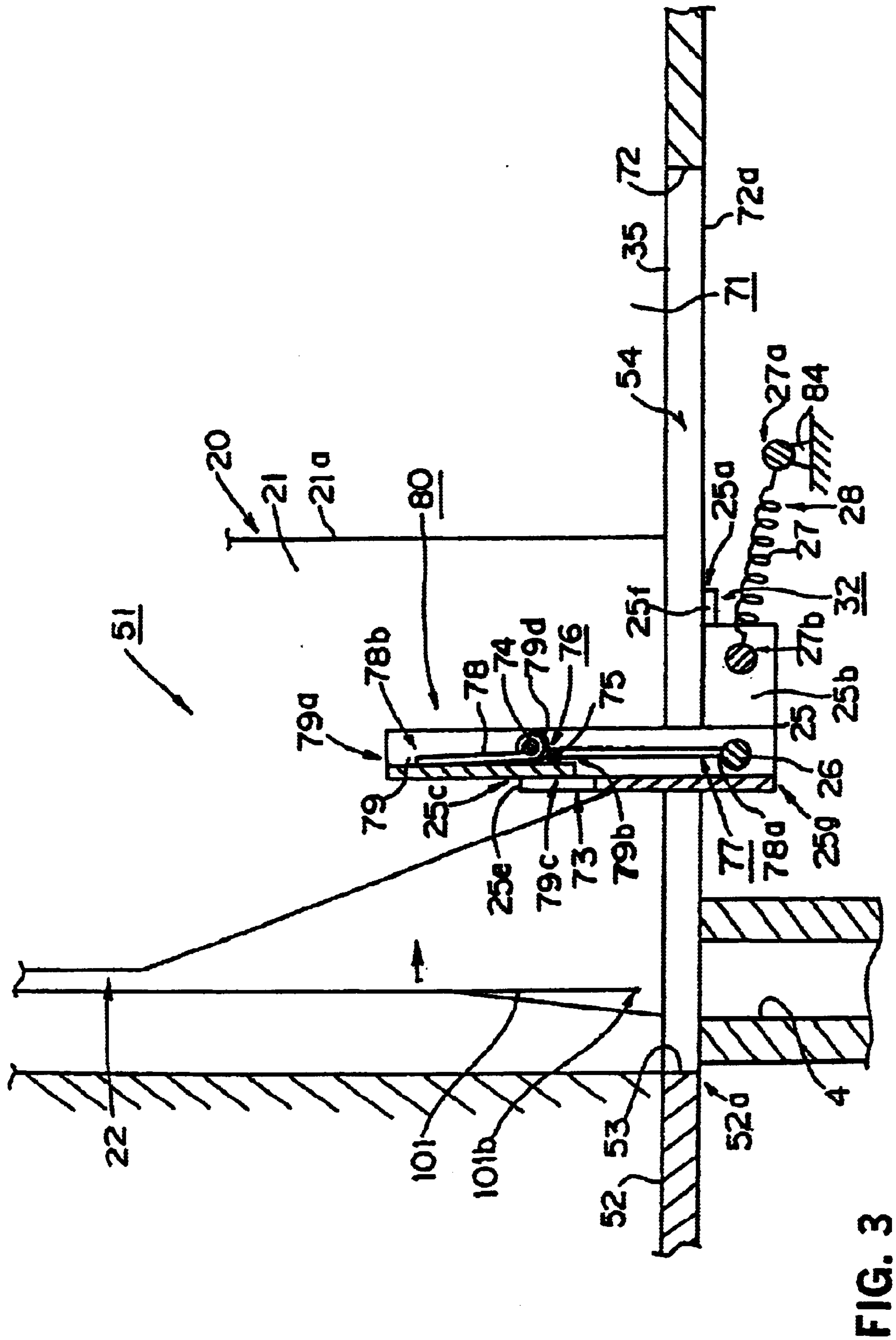
FIG. 3 is a conceptual cross-sectional view of a major portion of the bank-note processing device in accordance with the present invention.

In this bank-note processing device 51, the slits 22 of the bank-note guide drums 21 are positioned so as to match the bank-note transfer passage 4 at the initial position, as shown in FIG. 3, where the identical parts as FIG. 2 are denoted by the same numerals.

In the bank-note reverse-flowing preventive lever 80, at the initial position, the front end 25*e* of the long shaft 25*a* of the first lever 25 sticks out through the hole 54 in the direction parallel with the bank-note transfer passage 4 and toward the bank-note guide drums 21 side, since the protruding section 25*f* is in contact with the bottom face 72*a* of the notch section 72, and the entire second lever 79 sticks out through the hole 54 in the parallel direction as the bank-note transfer passage 4 and toward the bank-note guide drums 21 side, since the piece 79*c* is in contact with the shaft 75.

Figure 22:
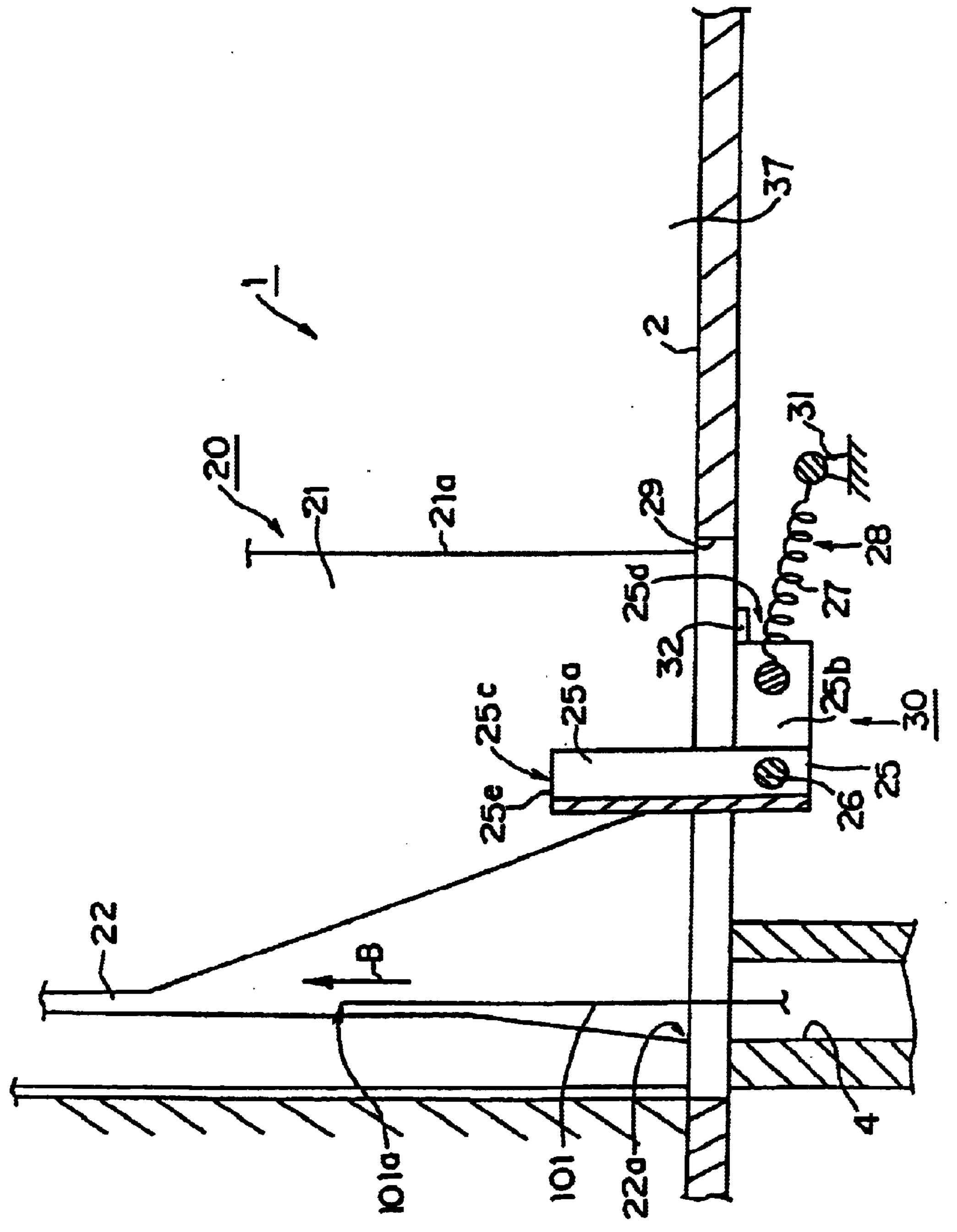
FIG. 22 is a conceptual cross-sectional view of a major portion depicting the operation of the conventional bank-note processing device.
Figure 23:
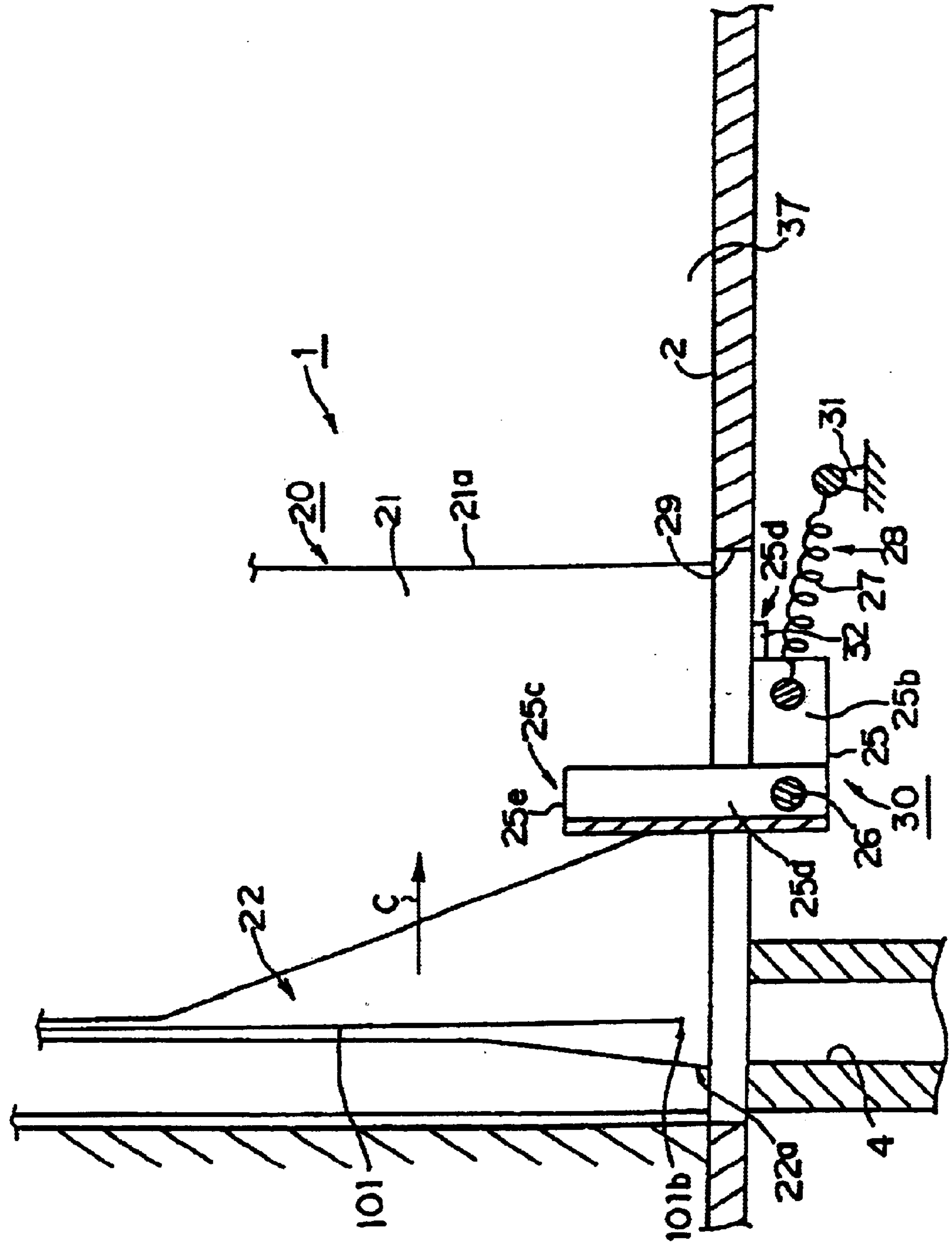
FIG. 23 is a conceptual cross-sectional view of a major portion depicting the operation of the conventional bank-note processing device.
Figure 24:
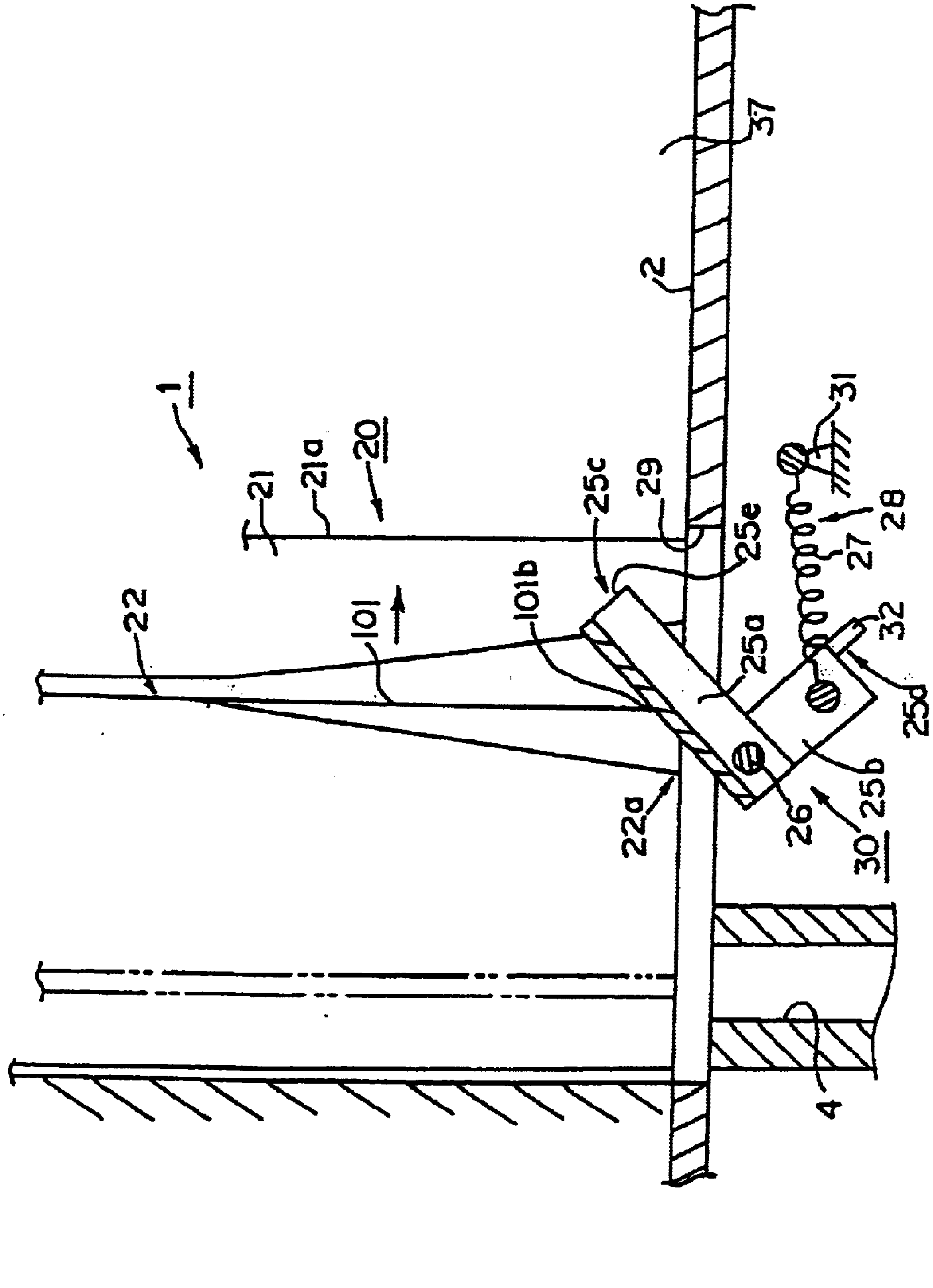
FIG. 24 is a conceptual cross-sectional view of a major portion depicting the operation of the conventional bank-note processing device.
Figure 25:
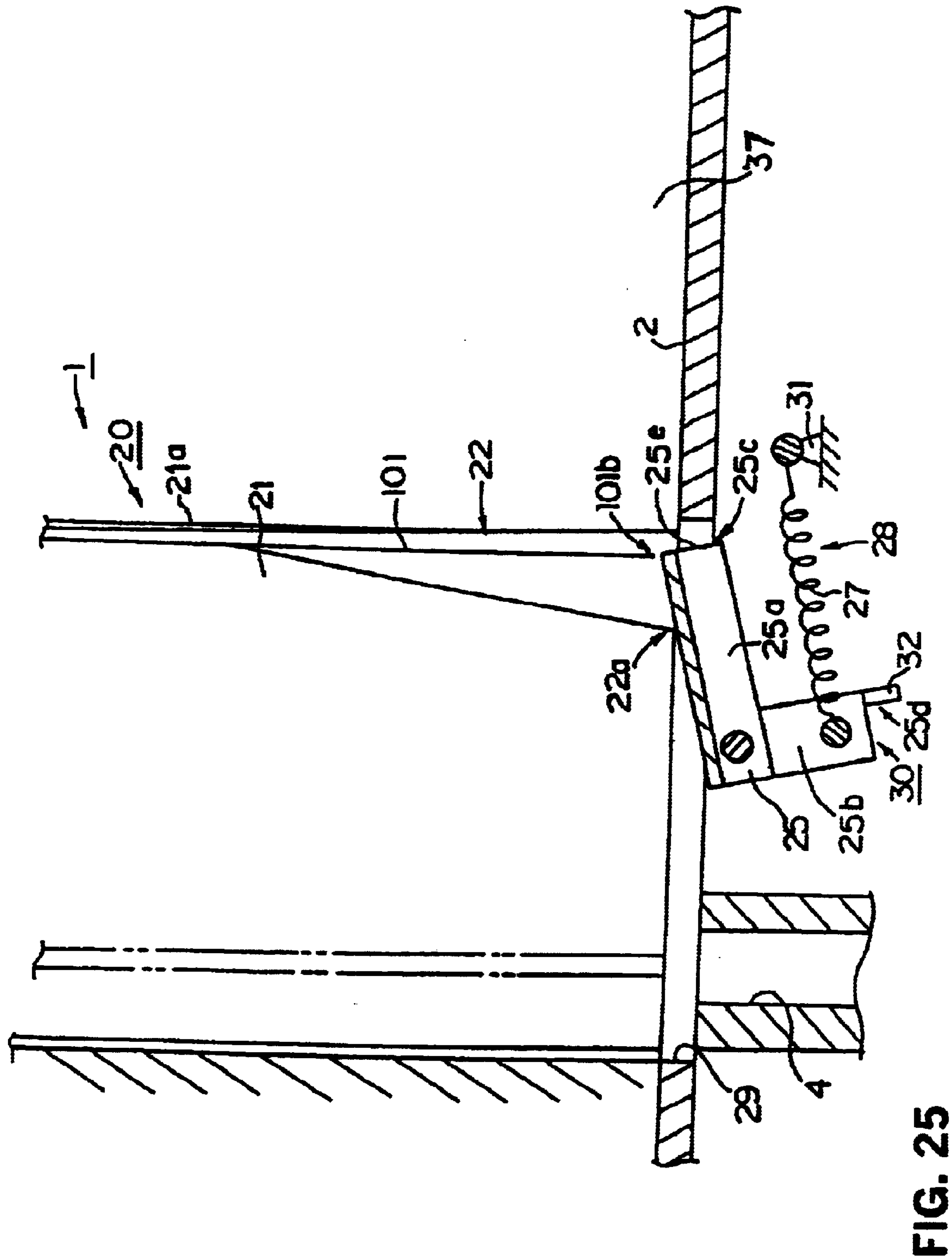
FIG. 25 is a conceptual cross-sectional view of a major portion depicting the operation of the conventional bank-note processing device.
Figure 26:
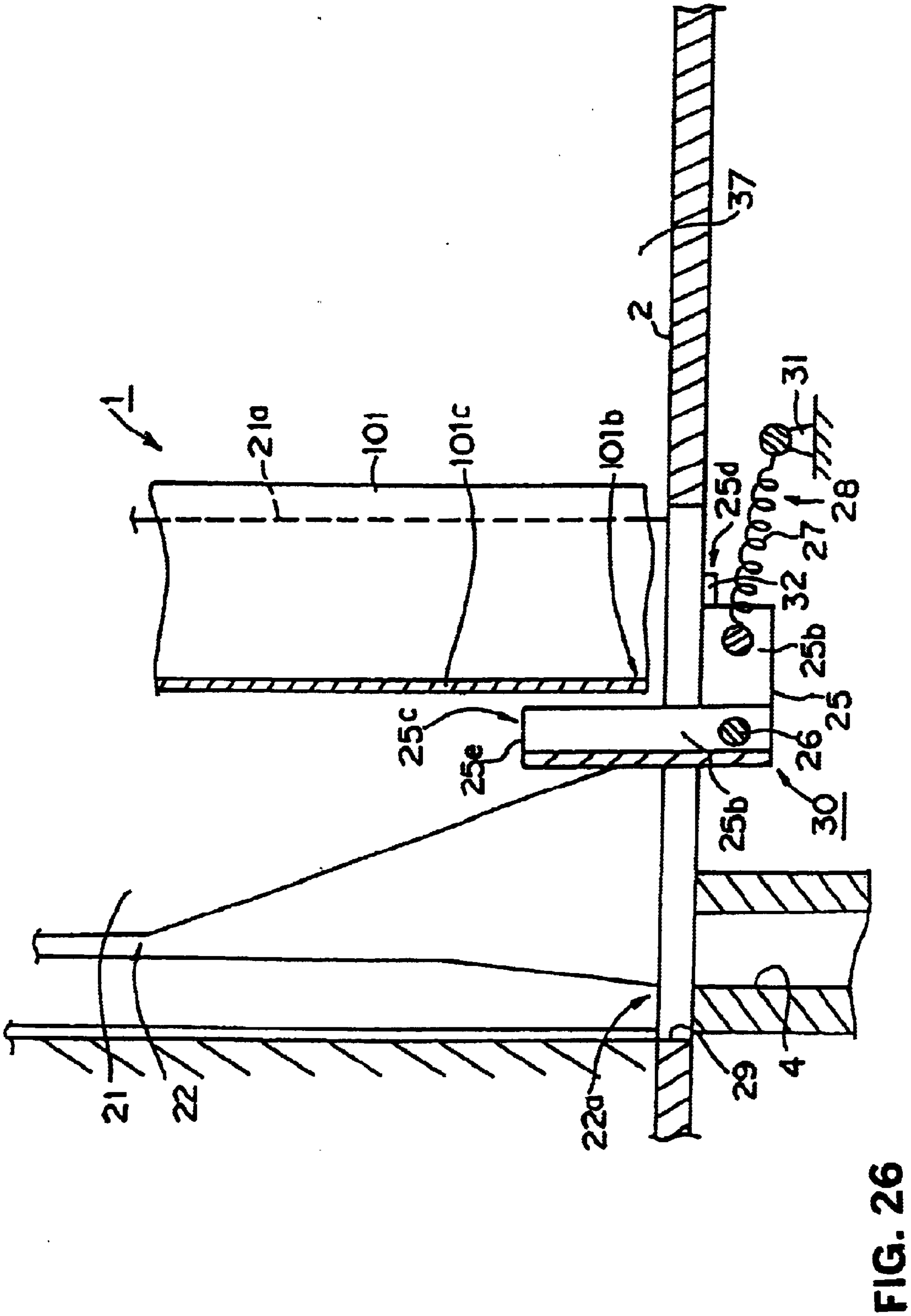
FIG. 26 is a conceptual cross-sectional view of a major portion depicting the operation of the conventional bank-note processing device.
Figure 27:
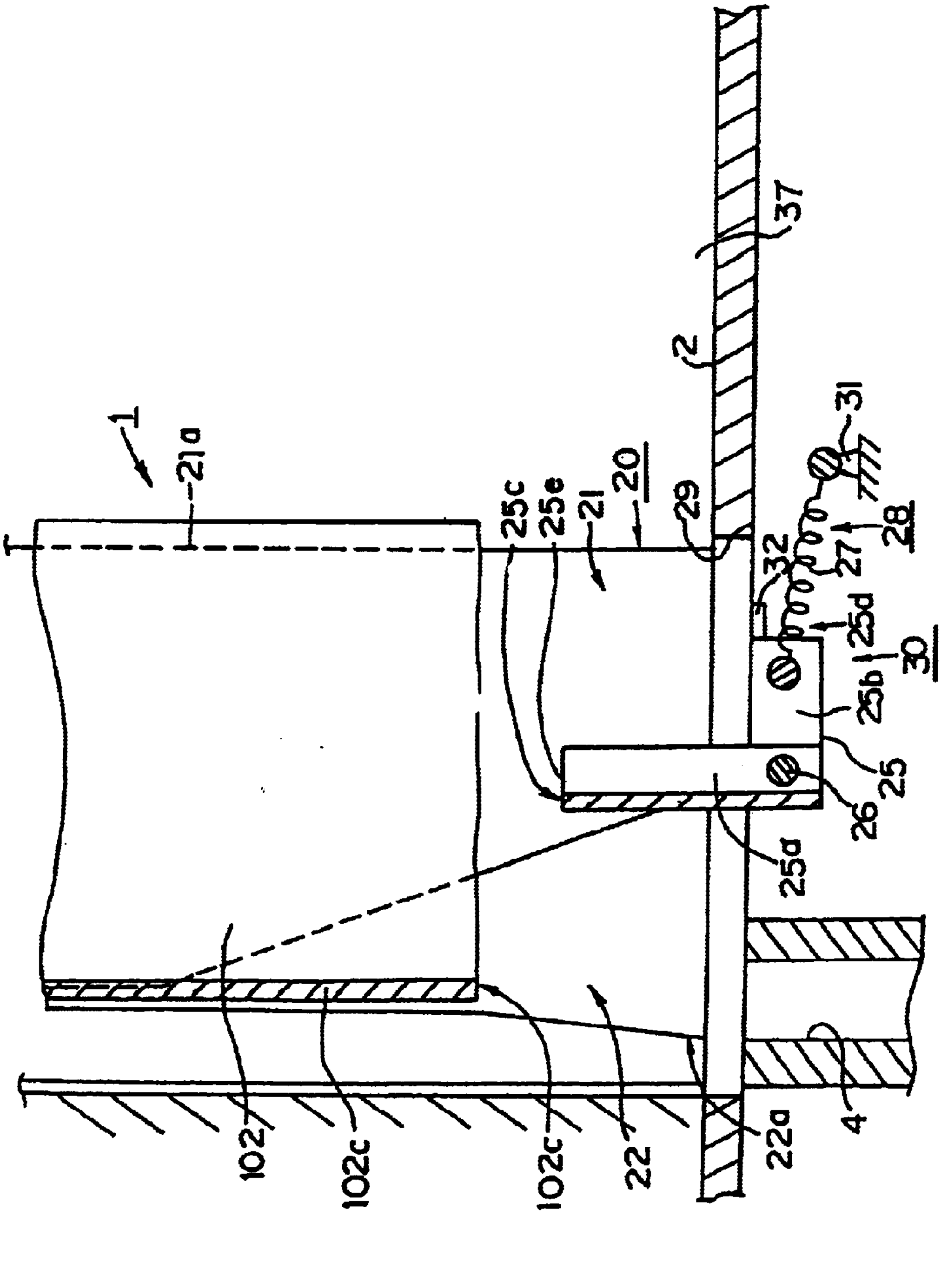
FIG. 27 is a conceptual cross-sectional view of a major portion depicting the operation of the conventional bank-note processing device.

When the bank-note 101, which is genuine, is transported along the bank-note transfer passage 4 by the bank-note transporting means 11, the front end is inserted into the bottom end 22*a* of the slits 22 of the bank-note guide drums (FIG. 22), and the inserted bank-note 101 is caught between the edge of the slits 22 of the bank-note guide drums 21 and the bank-note transporting belt 12 (FIG. 1), therefore the inserted bank-note 101 is transported further upstream along the slits 22 by the transporting force of the bank-note transporting belt 12.

When a sensor, not illustrated, detects that the bottom end 101*b* of the bank-note 101 reaches a predetermined position in the slits 22 of the bank-note guide drums 21, as shown in FIG. 3, normal rotation of the bank-note transporting belt 12 stops, and at the same time, the bank-note guide drums 21 rotate in opposite directions at a same phase, and as a result, the bank-note 101 inserted into the slits 22 parallel shifts toward the stacker 71 side.

Figure 4:
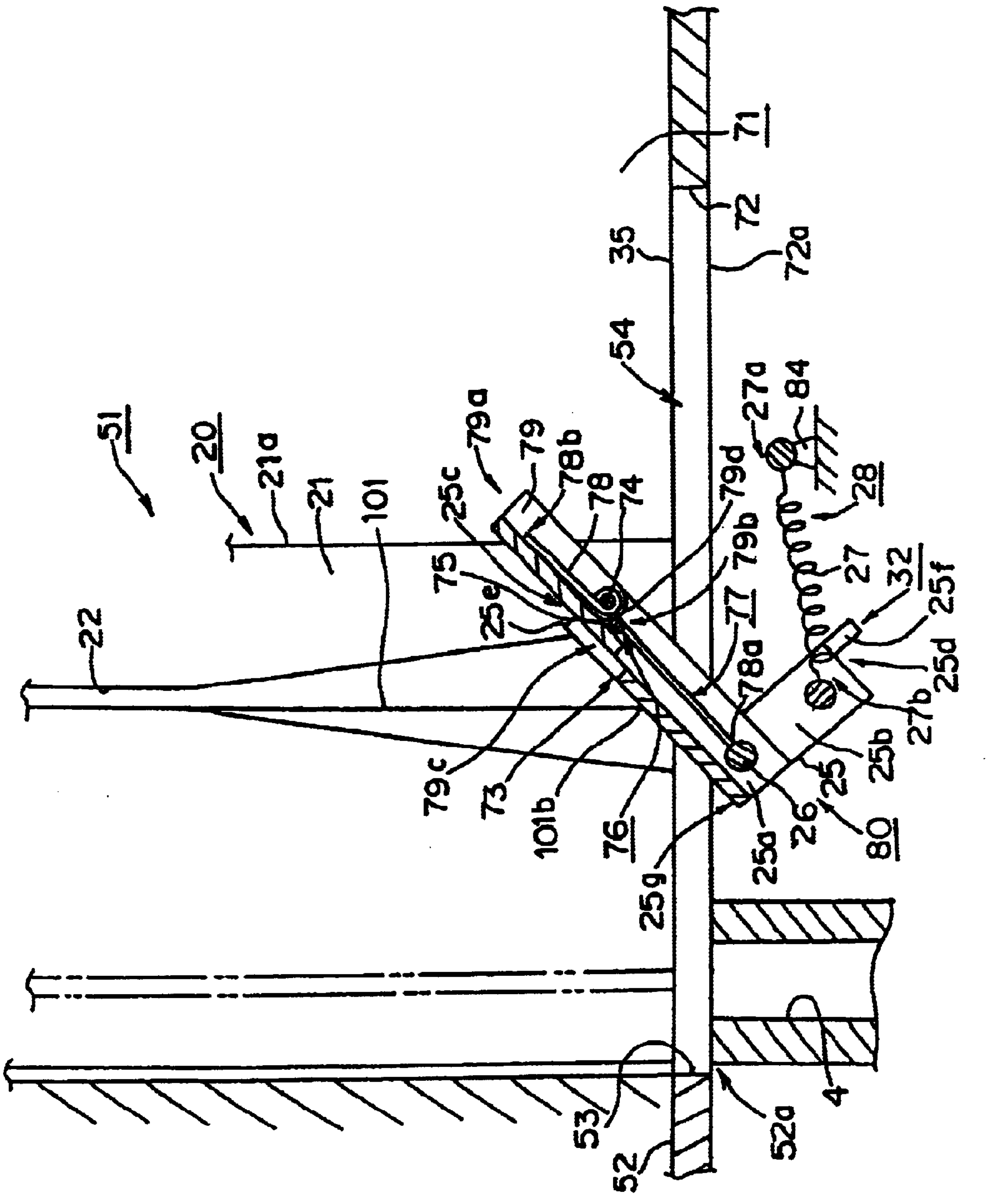
FIG. 4 is a conceptual cross-sectional view of a major portion of the bank-note processing device in accordance with the present invention.

When the bank-note 101 parallel shifts toward the stacker 71 side by the rotation of the bank-note guide drums 21, the bottom end 101*b* of the bank-note 101 having a normal longitudinal dimension contacts the long shaft 25*a* of the first lever 25, presses the first lever resisting the force exerted by the first urging means 28, and rotates the first lever 25 in the clockwise direction with the first shaft 26 as the center, as shown in FIG. 4, where the identical parts as FIG. 3 are denoted by the same numerals, therefore the first lever 25 gradually moves back into the hole 54 from the rear end side of the long shaft 25*a*, and the bank-note 101 parallel shifts more toward the stacker 71 side by the rotation of the bank-note guide drums 21. When the bank-note 101 parallel shifts toward the stacker 71 side by the rotation of the bank-note guide drums 21, the position, where the bottom end 101*b* of the bank-note 101 contacts the first lever 25, gradually shifts toward the front end 25*e* of the first lever 25 side. The second lever 79 rotates together with the first lever 25 while maintaining the initial position where the piece 79*c* is in contact with the shaft 75.

Figure 5:
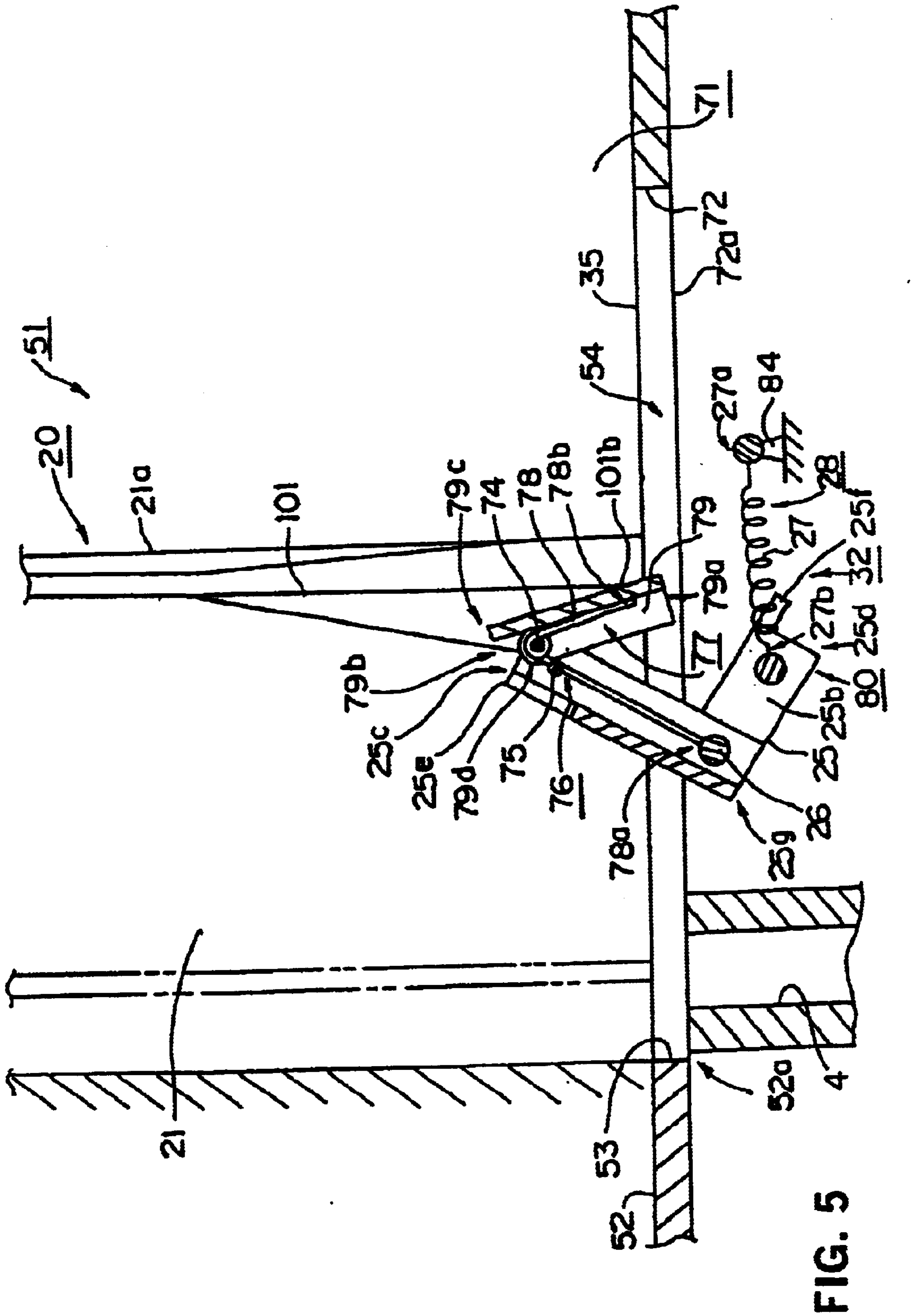
FIG. 5 is a conceptual cross-sectional view of a major portion of the bank-note processing device in accordance with the present invention.

When the bank-note 101 parallel shifts more toward the stacker 71 side by the rotation of the bank-note guide drums 21, the bottom end 101*b* of the bank-note 101 leaves from the first lever 25 and contacts the second lever 79, as shown in FIG. 5, where the identical parts as FIG. 3 are denoted by the same numerals. Then the first lever 25 gradually rotates counterclockwise with the first shaft 26 as the center by the force exerted by the first urging means 28. The second lever 79, on the other hand, rotates clockwise with the second shaft 74 as the center resisting the force exerted by the second urging means 77 by the force pressing the bottom end 101*b* of the bank-note 101, and the front end 79*a* gradually moves back into the hole 54, therefore the bank-note 101 parallel shifts more toward the stacker 71 side by the rotation of the bank-note guide drums 21. When the bank-note 101 parallel shifts toward the stacker 71 side, the position, where the bottom end 101*b* of the bank-note 101 contacts the second lever 71, gradually shifts toward the front end 79*a* side of the second lever 79.

Figure 6:
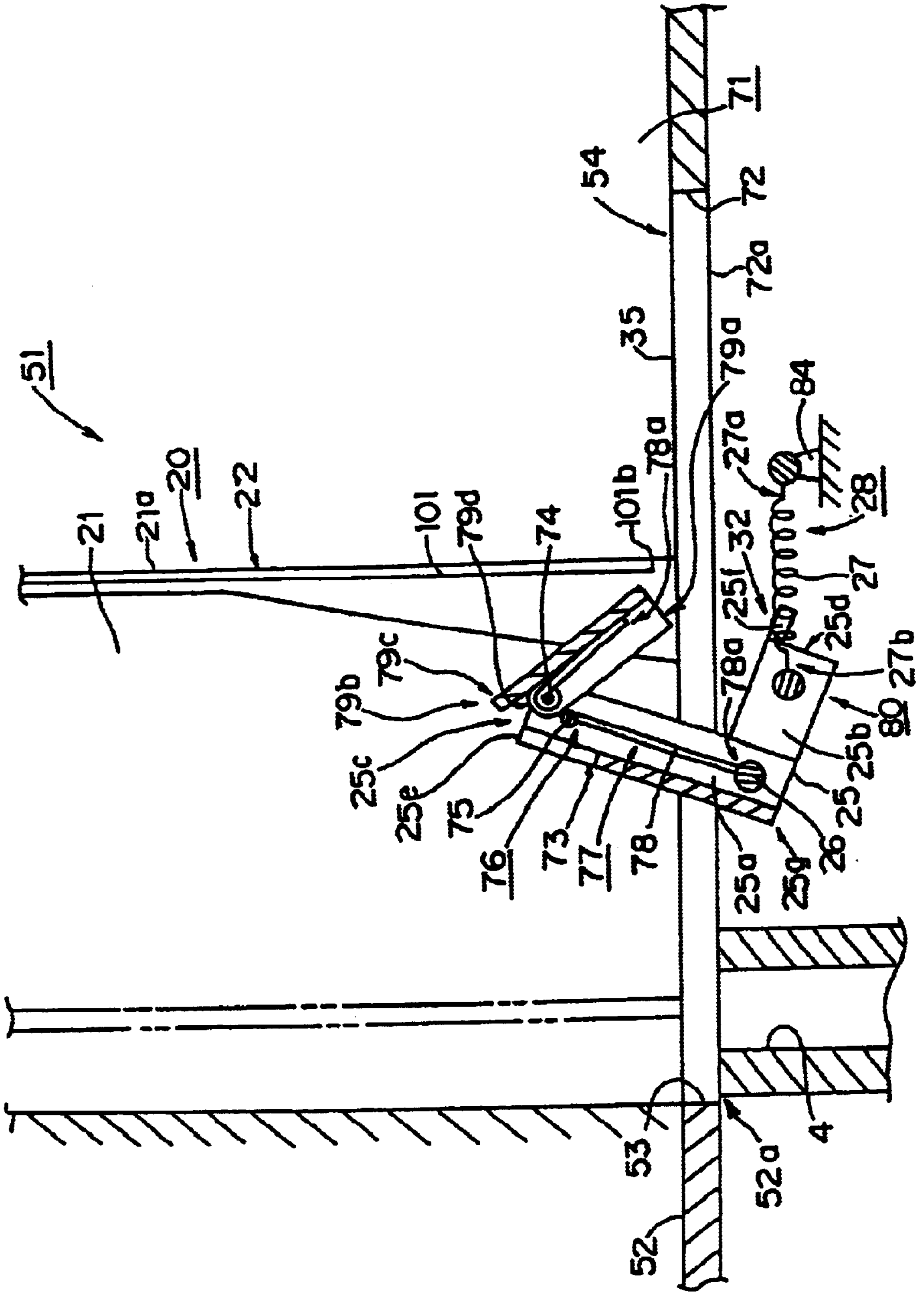
FIG. 6 is a conceptual cross-sectional view of a major portion of the bank-note processing device in accordance with the present invention.

When the bank-note 101 parallel shifts more toward the stacker 71 side by the rotation of the bank-note guide drums 21, the bottom end 101*b* of the bank-note 101 leaves from the front end 79*a* of the second lever 79, as shown in FIG. 6, where the identical parts as FIG. 3 are denoted by the same numerals. When the bottom end 101*b* of the bank-note 101 leaves from the front end 79*a* of the second lever 79, the second lever 79 rotates counterclockwise with the second shaft 74 as the center by the force exerted by the second urging means 77, and the first lever 25 rotates counterclockwise with the first shaft 26 as the center by the force exerted by the first urging means 28. And finally, the first and second levers 25 and 79 return to respective initial positions.

Figure 7:
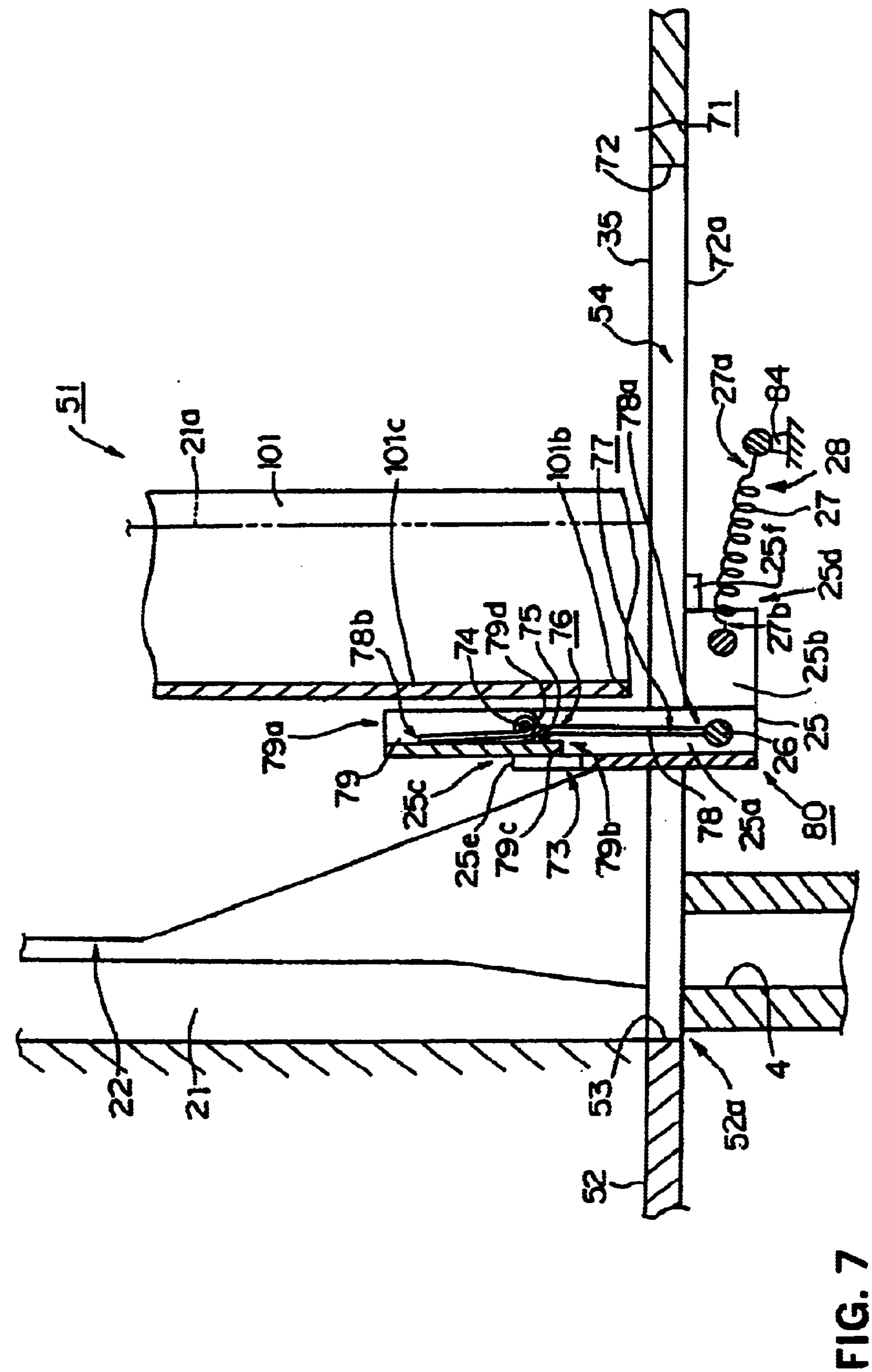
FIG. 7 is a conceptual cross-sectional view of a major portion of the bank-note processing device in accordance with the present invention.
Figure 28:
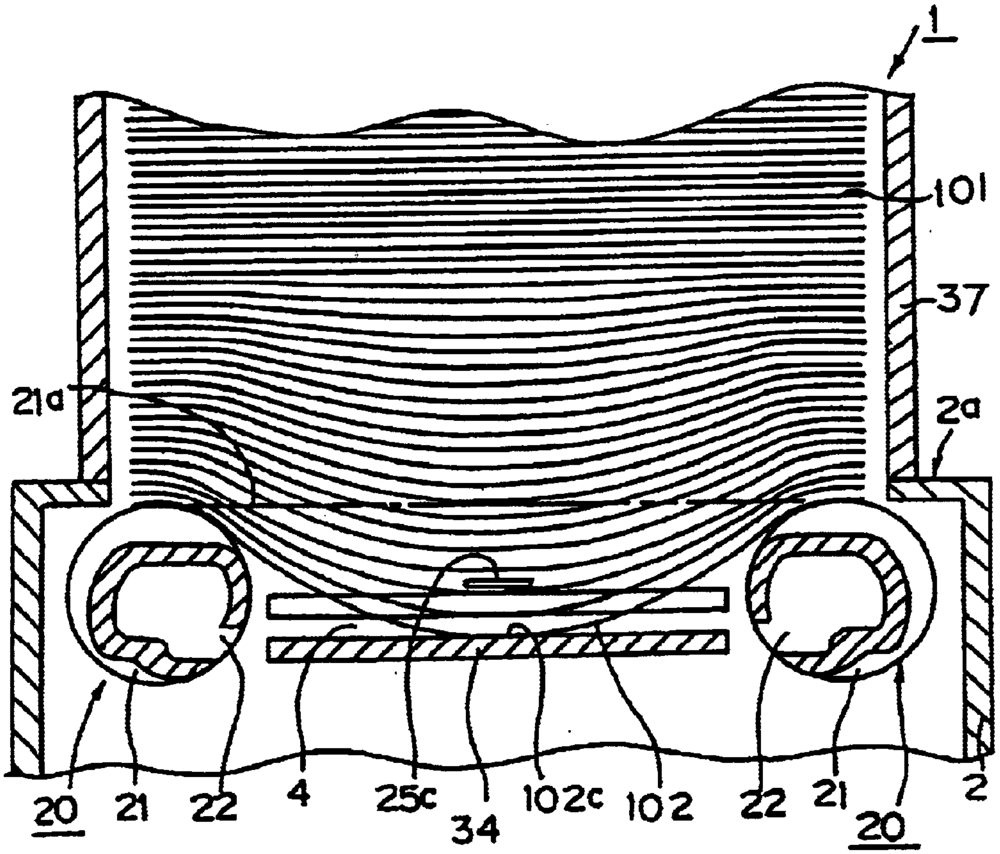
FIG. 28 is a conceptual top view of a major portion depicting a state where a bank-note stored in the stacker sticks out into the bank-note transfer passage of the conventional bank-note processing device.

When the bank-note 101 then parallel shifts even more toward the stacker 71 side by the rotation of the bank-note guide drums 21 and reaches the stacker 71, the bank-note 101 is caught between the stacker plate, not illustrated, and the external surface of the bank-note guide drums by the stack spring, not illustrated, and at the same time, the bank-note 101 is pressed by the chute 34 (FIG. 28) which constitutes the bank-note transfer passage 4 and moves to the stacker 71 side according to the rotation of the bank-note guide drums 21, therefore the bank-note 101 is released from the slits 22, and as a result, the bank-note 101 is loaded and stored in the stacker 71 without fail, as shown in FIG. 7, where the identical parts as FIG. 3 are denoted by the same numerals. When the bank-note 101 in the slits 22 reaches the stacker 71, the slits 22 of the bank-note guide drums 21 reach the position at the outer diameter 21*a* of the bank-note guide drums 21.

So the inserted bank-note 101 having a normal longitudinal dimension is stacked and stored in the stacker 71, as shown in FIG. 7, and the bottom end 101*b* of the bank-note 101 engages with the bank-note reverse-flowing preventive lever 80, by which the potential problem where the bank-note 101 stored in the stacker 71 is pressed by another bank-note stored in the stacker 71 before or by the stacker plate, not illustrated, and roughly the center 101*c* in the width direction of the bank-note 101 sticks out into the bank-note transfer passage 4, interfering in transporting the bank-note to be stored next can be prevented as much as possible.

Figure 8:
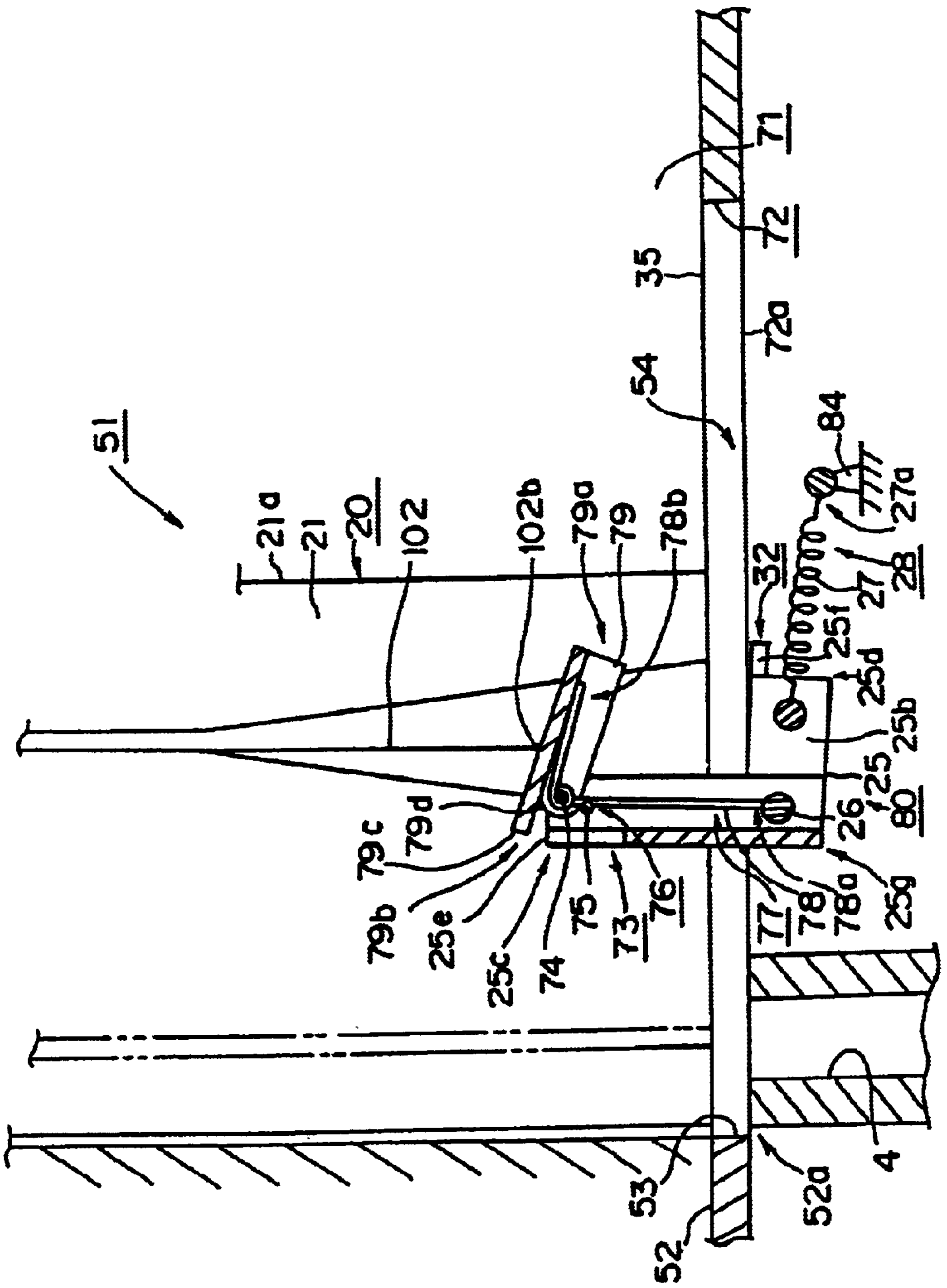
FIG. 8 is a conceptual cross-sectional view of a major portion of the bank-note processing device in accordance with the present invention.

If a bank-note inserted in the slits 22 and to be parallel shifted toward the stacker 71 side is a bank-note 102 which has a short longitudinal dimension, when the bank-note 102 parallel shifts toward the stacker 71 side by the rotation of the bank-note guide drums 21, the bottom end 102*b* of the bank-note 102 contacts the second lever 79, as shown in FIG. 8, where the identical parts as FIG. 3 are denoted by the same numerals, and at the same time, the bottom end 102*b* of the bank-note 102 presses the second lever 79 resisting the force exerted by the second urging means 77, and rotates the second lever 79 clockwise with the second shaft 74 as the center, by which the second lever 79 gradually moves back from the moving direction of the bank-note 102, and the bank-note 102 parallel shifts more toward the stacker 71 side by the rotation of the bank-note guide drums 21. When the bank-note 102 parallel shifts toward the stacker 71 side by the rotation of the bank-note guide drums 21, the position, where the bottom end 102*b* of the bank-note 102 contacts the second lever 79, gradually shifts toward the front end 79*a* of the second lever 79 side. Since the second lever 79 rotates resisting the force exerted by the second urging means 77, the first lever 25 slightly rotates clockwise with the first shaft 26 as the center by the resilience of the second urging means 77, resisting the force exerted by the first urging means 28.

Figure 9:
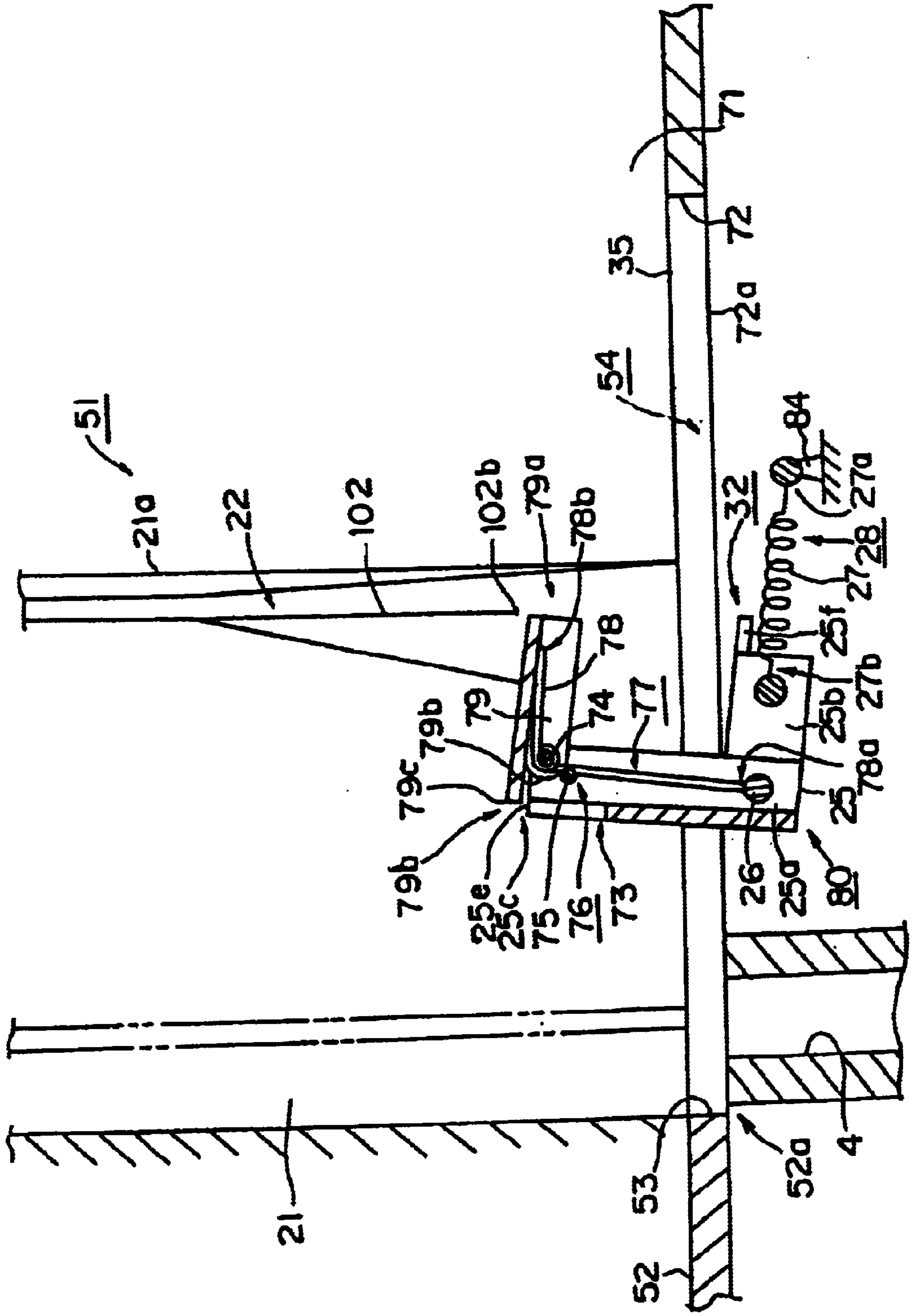
FIG. 9 is a conceptual cross-sectional view of a major portion of the bank-note processing device in accordance with the present invention.

When the bank-note 102 parallel shifts more toward the stacker 71 side by the rotation of the bank-note guide drums 21, the bottom end 102*b* of the bank-note 102 leaves from the front end 79*a* of the second lever 79, as shown in FIG. 9, where the identical parts as FIG. 3 are denoted by the same numerals. Then the second lever 79 rotates counterclockwise with the second shaft 74 as the center by the force exerted by the second urging means 77, and the first lever 25 also rotates counterclockwise with the first shaft 26 as the center by the force exerted by the first urging means 28. And finally, both the first and second levers 25 and 79 return to the respective initial positions.

Figure 10:
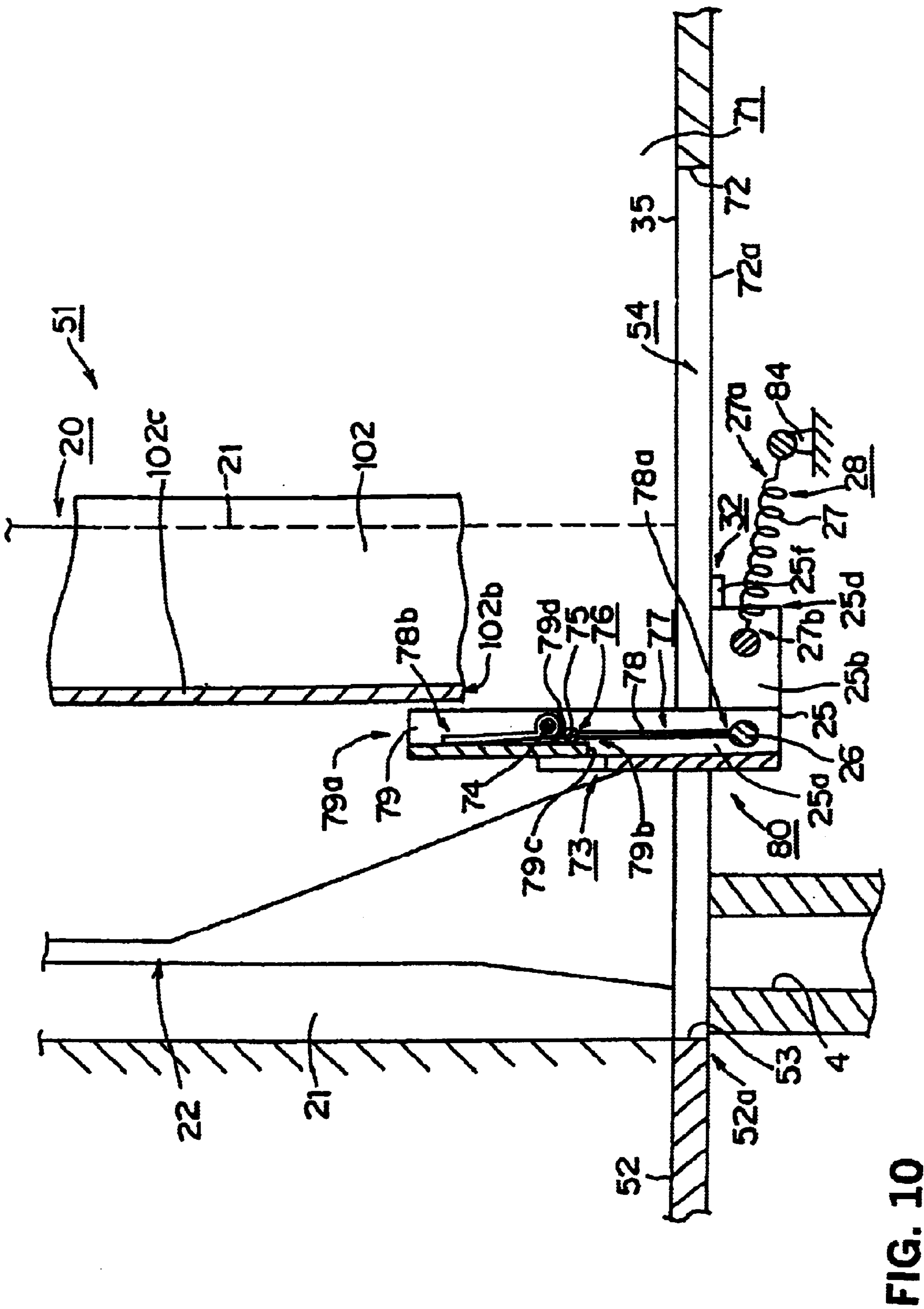
FIG. 10 is a conceptual cross-sectional view of a major portion of the bank-note processing device in accordance with the present invention.

When the bank-note 102 then parallel shifts even more toward the stacker 71 side by the rotation of the bank-note guide drums 21, and the bank-note 102 in the slits 22 reaches the stacker 71, the bank-note 102 is caught between the stacker plate, not illustrated, and the external surface of the bank-note guide drums by the stack spring, not illustrated, and at the same time, the bank-note 102 is pressed by the chute 34 (FIG. 28) which constitutes the bank-note transfer passage 4 and moves to the stacker 71 side according to the rotation of the bank-note guide drums 21, therefore the bank-note 102 is released from the slits 22, and as a result, the bank-note 102 is loaded and stored in the stacker 71 without fail, as shown in FIG. 10, where the identical parts as FIG. 3 are denoted by the same numerals. When the bank-note 102 in the slits 22 reaches the stacker 71, the slits 22 of the bank-note guide drum 21 reach the position at the outer diameter 21*a* of the bank-note guide drums 21 shown in the drawing.

This means that even a bank-note 102 which has a short longitudinal dimension can be stacked and stored in the stacker 71 and the bottom end 102*b* of the bank-note 102 engages with the front end 79*a* of the second lever 79 of the bank-note reverse-flowing preventive lever 80, as shown in FIG. 10, therefore the potential problem that the bank-note 102 once stored in the stacker 71 is pressed by another bank-note stored in the stacker 71 before or by the stacker plate, not illustrated, and roughly the center 102*c* in the width direction of the bank-note 102 sticks out into the bank-note transfer passage 4, interfering in transporting the bank-note to be stored next can be prevented as much as possible.

In this way, in the bank-note processing device 51, the bank-note reverse-flowing preventive lever 80 is rotatably supported via the first shaft 26, and is comprised of the first lever 25 which is shorter then the outer diameter 21*a* of the bank-note guide drums 21, the first energy exerting means 28 which constantly exerts force on the first lever 25 toward the bank-note transfer passage 4 side, the first stop 32 which controls the first lever 25 not to rotate more than at a predetermined rotation angle toward the bank-note transfer passage 4 side, the second lever 79 which is rotatably supported at the front end 25*c* of the first lever 25 via the second shaft 74, the second stop 76 which controls the second lever 79 not to rotate more than at a predetermined angle toward the bank-note transfer passage 4, and the second urging means 77 which constantly exerts force on the second lever 79 toward the bank-note transfer passage 4 side, therefore at the initial position where the bank-note reverse-flowing preventive lever 80 returns after storing the bank-note in the stacker 71, the length of the portion sticking out through the hole 54 toward the bank-note guide drums 21 is longer compared with the prior art, and as a result, the bank-note stored in the stacker 71 engages with the bank-note reverse-flowing preventive lever 80 without fail, even if the inserted bank-note is a bank-note 102 having a short longitudinal dimension.

Also in this bank-note processing device 51, the second lever 79 is rotatably supported, via the second shaft 74, at the front end 25*c* of the rotatable first lever, which is shorter than the outer diameter 21*a* of the bank-note guide drums 21 and on which force is constantly exerted toward the bank-note transfer passage 4 side by the first urging means 28, and force is constantly exerted on the second lever 79 toward the bank-note transfer passage 4 side by the second urging means 77, therefore the bottom end of the bank-note leaves from the front end 79*a* of the lever 79 before the bank-note reverse-flowing preventive lever 80, which is shifted in parallel with the bank-note transfer passage 4 by the rotational driving of the bank-note guide drum 21, reaches the outer diameter 21*a* of the bank-note guide drums, that is, before the bank-note reaches the stacker 71, and as a result, the bank-note reverse-flowing preventive lever 80 returns to the initial position without fail when the bank-note is stored in the stacker 71. As a consequence, the potential problem where the bank-note reverse-flowing preventive lever 80 engages with the bottom end of the bank-note pressed by another bank-note stored in the stacker 71 before and cannot return to the initial position can be prevented as much as possible.

Even when the inserted bank-note is a bank-note 102 having a short longitudinal dimension, the bank-note 102 can be engaged with the bank-note reverse-flowing preventive lever 80 without fail when the bank-note 102 is stored in the stacker 71, and the potential problem where the bank-note 102 once stored in the stacker 71 is pressed by another bank-note stored in the stacker 71 before or by the stacker plate, not illustrated, and roughly the center 102*c* in the width direction of the bank-note sticks out into the bank-note transfer passage 4, interfering in transporting the bank-note to be stored next can be prevented as much as possible.

In other words, when the bank-notes of which longitudinal dimensions vary are stored in the stacker 71, the bank-note processing device 51 can engage the bank-notes with the bank-note reverse-flowing preventive lever 80 without fail, and the potential problem where the bank-note once stored in the stacker 71 sticks out into the bank-note transfer passage 4 interfering in transporting the bank-note to be stored next can be prevented as much as possible.

Particularly, the bank-notes stored in the stacker 71 tend to swell toward the bank-note transfer passage 4 side by air which enters into the center area of the bank-notes in the width direction, therefore having this bank-note reverse-flowing preventive lever 80 is effective to prevent the above potential problems.

Also in the bank-note processing device 51, when an inserted bank-note is positioned at a predetermined position in the slits 22 of the bank-note guide drums 21, the bank-note can be engaged with the bank-note reverse-flowing preventive lever 80 even if the bank-note is positioned above the predetermined position due to a positioning error, and is stored in the stacker 71 in this state, therefore the potential problem where the bank-note stored in the stacker 71 is not engaged with the bank-note reverse-flowing preventive lever 80 and sticks out into the bank-note transfer passage 4 interfering in transporting the bank-note to be stored next can be prevented as much as possible.

Now the structure of the stored bank-note drop prevention means which prevents the bank-note stored in the stacker from dropping through the lower part of the stacker when the stacker is separated from the main body stated in (2) related to the second aspect of the present invention will be explained.

Figure 11:
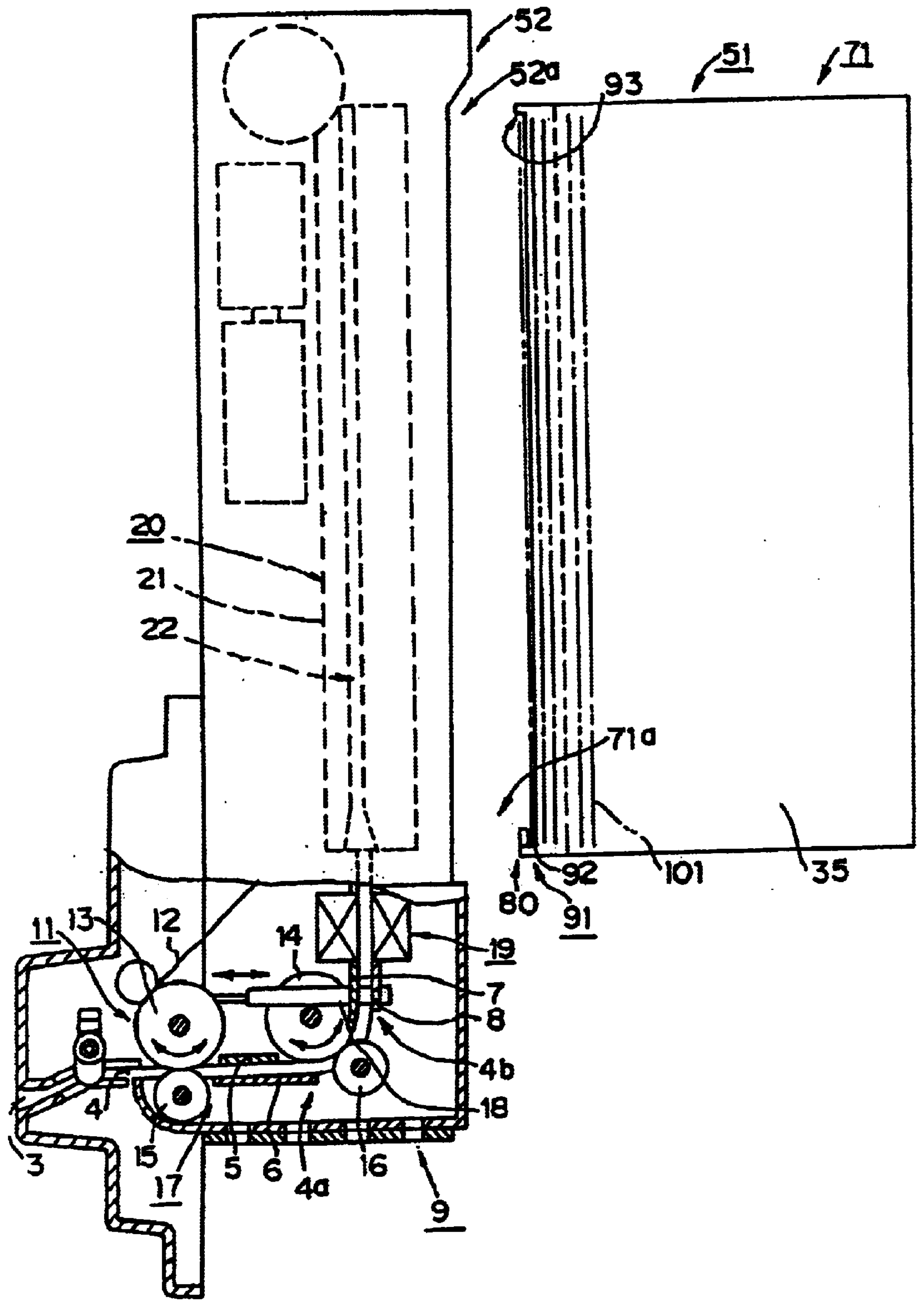
FIG. 11 is a conceptual cross-sectional side view of a major portion of the bank-note processing device in accordance with the present invention depicting a state where the stacker is separated from the main body.
Figure 12:
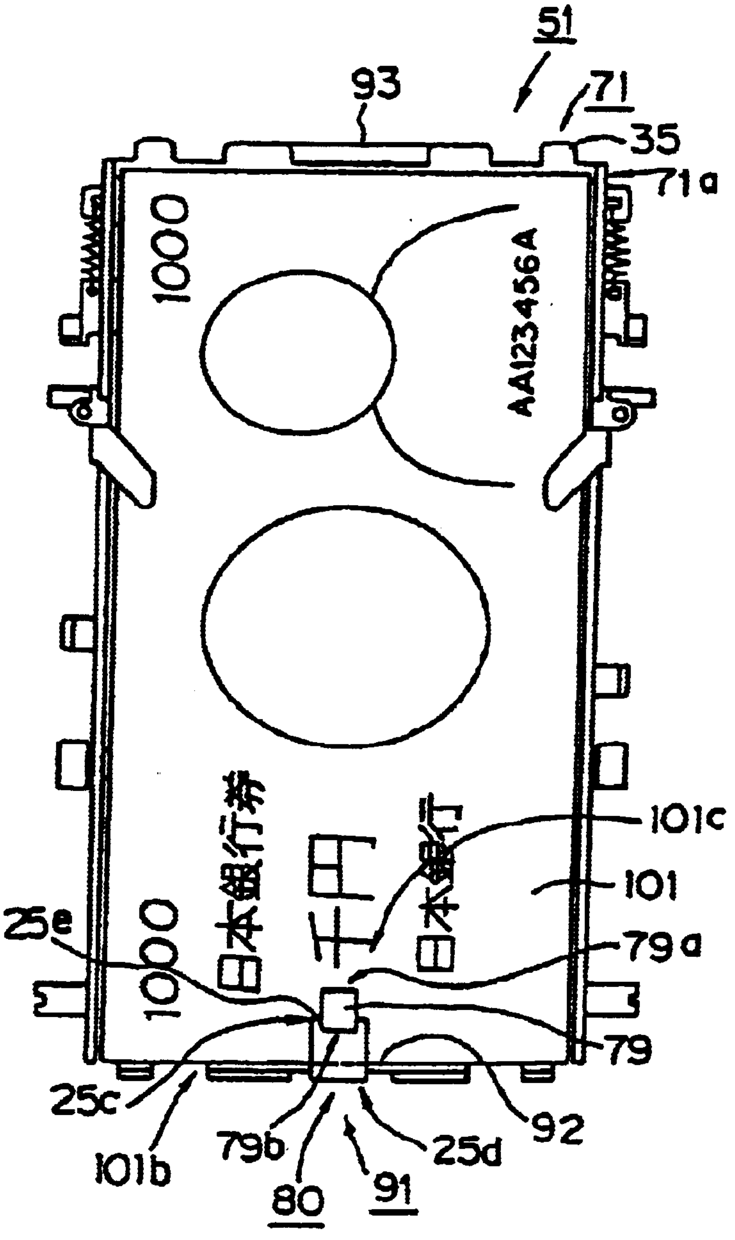
FIG. 12 is a conceptual plan view of a major portion depicting the operation of the stacker constituting the bank-note processing device in accordance with the present invention.

The stored bank-note drop prevention means 91 is comprised of the above mentioned bank-note reverse-flowing preventive lever 80, as shown in FIG. 11, which is a conceptual cross-sectional view of a major portion depicting the state where the stacker is separated from the main body. The bank-note reverse-flowing preventive lever 80 is disposed at the protruding section 92 which is on the front face 71*a* of the stacker 71, roughly at the center of the lower part of the body 35 of the stacker 71, as shown in FIG. 11 and FIG. 12, which depicts the front face of the stacker. On the front face 71*a* of the stacker 71, the protruding section 93 is also disposed, roughly at the center of the upper part of the body 35.

In the bank-note processing device 51 comprising this stored bank-note drop prevention means 91, as shown in FIG. 11, when the protruding section 92 disposed at the lower part of the stacker 71 is inter-fitted into the interfit groove, not illustrated, which is formed on the rear face 52*a* of the main body 52, not illustrated, roughly at the center in the longitudinal direction, the notch 72 is positioned at the position of the notch 53 of the main body 52, as shown in FIG. 2, so as to form a hole 54. Also when the protruding section 93 formed at the upper part of the stacker 71 shown in FIG. 11 is inter-fitted with the attachment groove, which is formed on the rear face 52*a* of the main body 52 and at the upper part in the longitudinal direction, the stacker 71 can be attached to the main body 52, as shown in FIG. 1.

Figure 13:
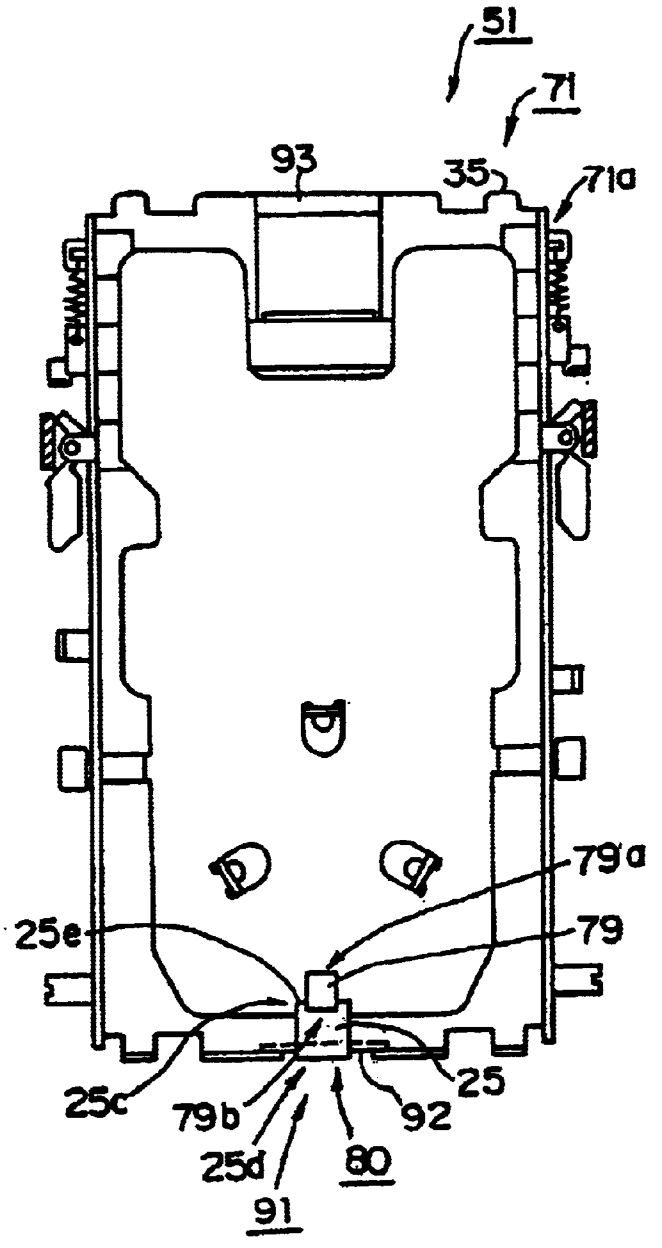
FIG. 13 is a conceptual cross-sectional view of a major portion depicting the operation of the stacker constituting the bank-note processing device in accordance with the present invention.

FIG. 13 is a conceptual plan view depicting the front face of the stacker when the separated stacker is attached to the main body.

The stacker 71 can be separated from the main body 52 as shown in FIG. 11 if the operation in reverse of the above procedure is performed, and in the stacker 71 separated from the main body 52 in this way, the bank-note 101 stored in the stacker 71 is confined roughly at the center 101*c* and at the lower parts of the side faces of the bank-note 101 and the bottom end of the bank-note 101 by the first lever 25 and the second lever 79 of the bank-note reverse-flowing preventive lever 80, therefore the potential problem where the bank-note 101 stored in the stacker 71 drops from the stacker 71 when the stacker 71 is separated from the main body is prevented as much as possible, which further improves safety in bank-note collection operation.

Now the structure of the box attachment/removal means stated in (3) related to the third aspect of the present invention will be explained.

The box 9 shown in FIG. 1 is a box 9 comprised of an L-shape in the cross-section where the entire bottom chute 6 area of the horizontal portion 4*a* constituting the L-shaped bank-note transfer passage 4 and the upstream part of the bottom chute 8 of the vertical portion 4*b*, which are integrated, just like the prior art. The L-shaped bank-note transfer passage 4 comprises the horizontal portion 4 which is further comprised of chutes 6 and 7 and the vertical portion 4*b*, which is further comprised of chutes 8 and 9.

Figure 14:
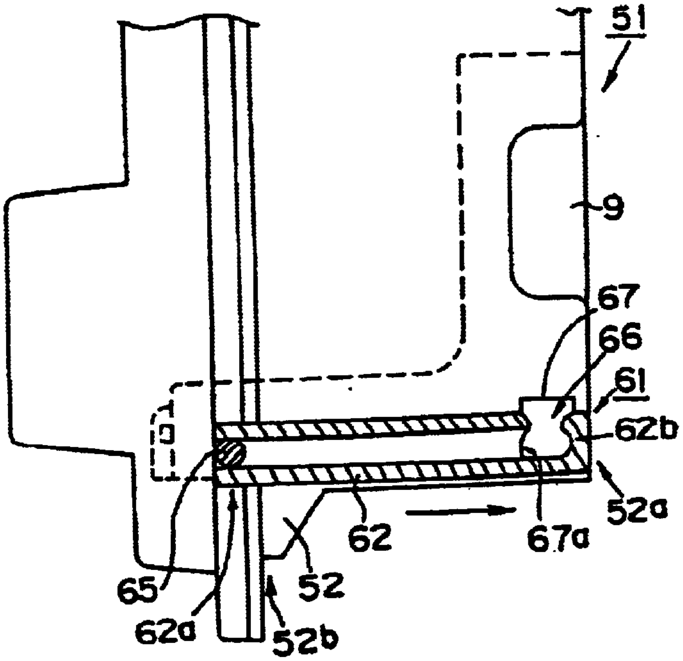
FIG. 14 is a conceptual cross-sectional view of a major portion depicting the attachment/removal operation of the box constituting the bank-note processing device in accordance with the present invention.

The box 9 is removably attached to the main body 52 by the attachment/removal means 61, as shown in FIG. 14, where the identical portions as FIG. 1 are denoted by the same numerals, and is temporarily rotatably supported at the main body 52. FIG. 14 is a conceptual cross-sectional view of a main portion of the bank-note processing device 51, where the pulleys 15 and 16 and other parts disposed in the box 9 are not illustrated.

This attachment/removal means 61 comprises a guide groove 62 which is formed on both sides of the inner surface of the main body 52, a guide protrusion 65 which is formed on both sides of the box 9 and is guided into the guide groove 62, a guide protrusion escape hole 66, which is formed at the end of the guide groove 62 directed upward, and a guide protrusion support hole 67 which is formed on both sides of the main body 52 and at the end 62*b* of the guide groove 62.

In the bank-note processing device 51 having this attachment/removal means 61, the guide protrusion 65 is inserted in one end 62*a* of the guide groove 62 in the initial state where the box 9 is attached to the main body 52 shown in FIG. 14.

Figure 15:
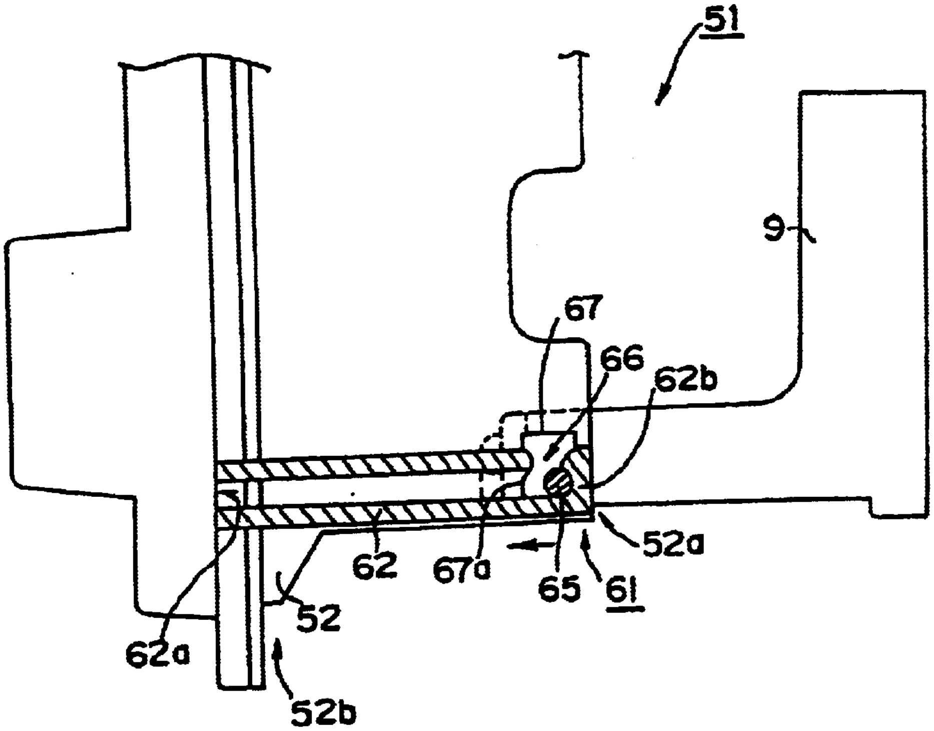
FIG. 15 is a conceptual cross-sectional view of a major portion depicting the attachment/removal operation of the box constituting the bank-note processing device in accordance with the present invention.

To separate the box 9 from the main body 52, the guide protrusion 65 in the guide groove 62 is guided into the rear face 52*a* side of the main body 52 along the guide groove 62, and the guide protrusion 65 is contacted to the end 62*b* of the guide groove 62 as shown in FIG. 15, where the identical parts as FIG. 14 are denoted by the same numerals. At this time, the guide protrusion 65 is inserted in the guide protrusion support hole 67, but the guide protrusion 65 cannot be guided upward since the guide groove 62 is positioned at the upper part.

Figure 16:
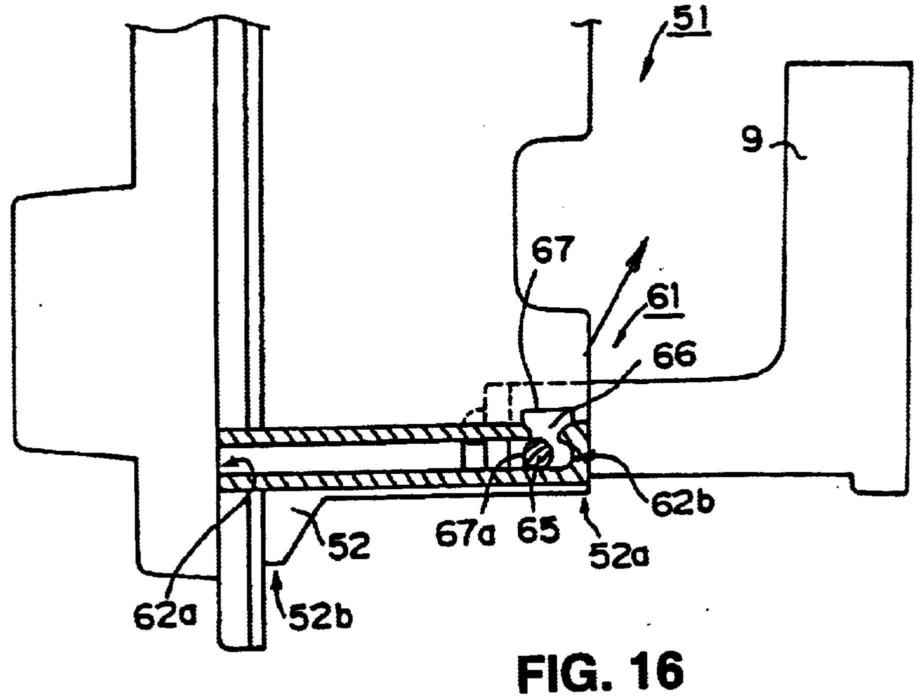
FIG. 16 is a conceptual cross-sectional view of a major portion depicting the attachment/removal operation of the box constituting the bank-note processing device in accordance with the present invention.
Figure 17:
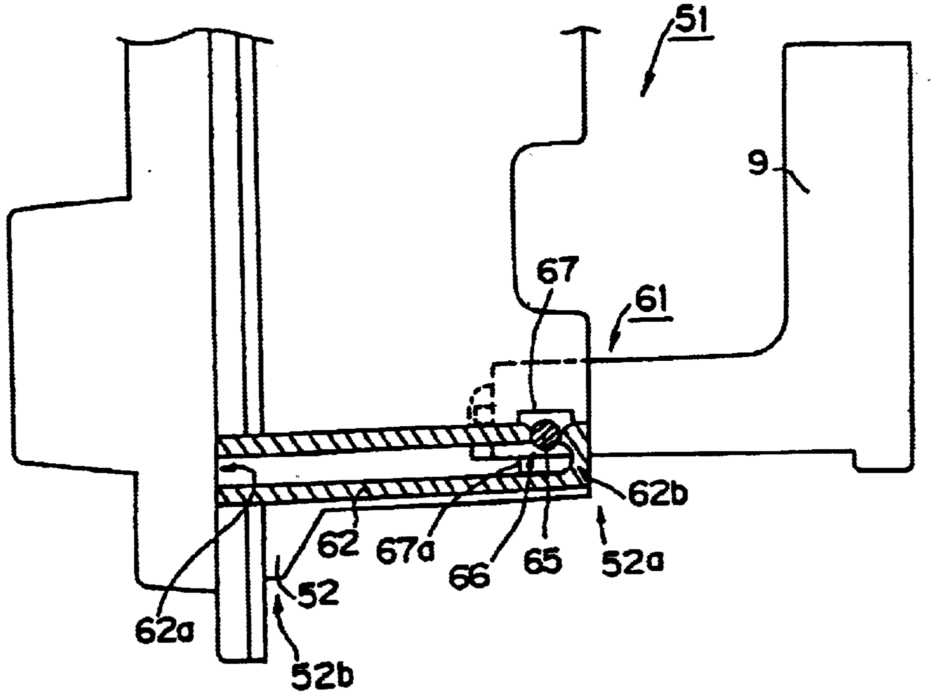
FIG. 17 is a conceptual cross-sectional view of a major portion depicting the attachment/removal operation of the box constituting the bank-note processing device in accordance with the present invention.
Figure 18:
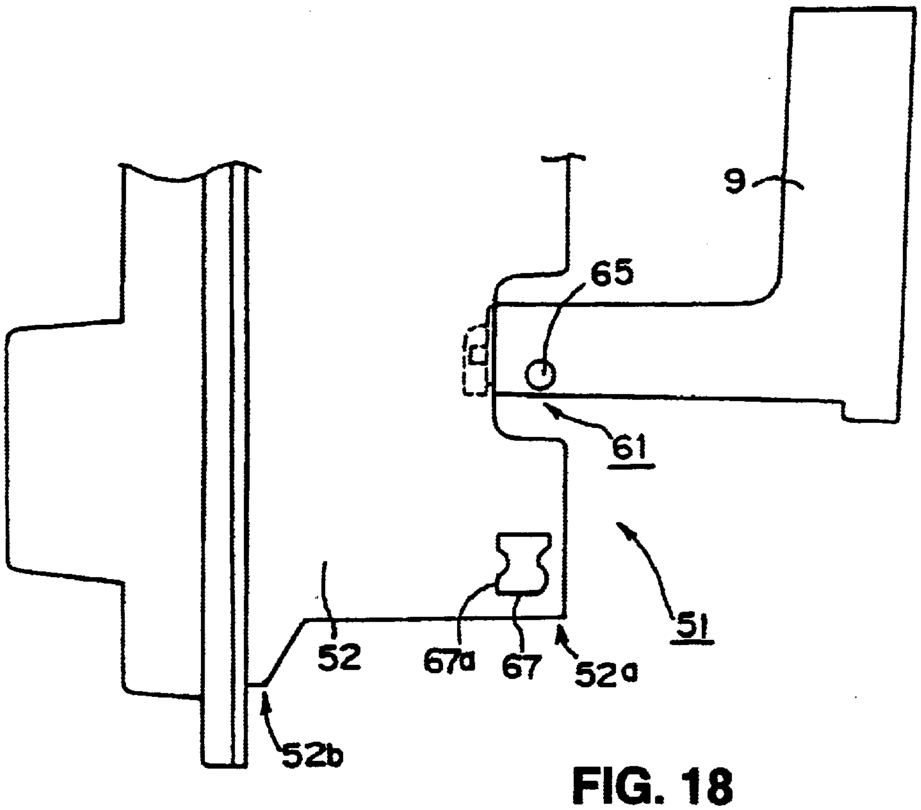
FIG. 18 is a conceptual plan view of a major portion depicting the attachment/removal operation of the box constituting the bank-note processing device in accordance with the present invention.

When the guide protrusion 65 is guided toward the front face 52*b* side of the main body 52 along the guide groove 62, the guide protrusion 65 contacts a part 67*a* of the guide supporting hole 67 where the guide protrusion 65 is inserted as shown in FIG. 16, where the identical parts as FIG. 14 are denoted by the same numerals, and when the guide protrusion 65 is guided further upward along the shape of the guide supporting hole 67, the guide protrusion 65 passes through the guide protrusion escape hole 66 as shown in FIG. 17, where the identical parts as FIG. 14 are denoted by the same numerals, and the engagement between the guide protrusion 65 and the guide groove 62 is cleared, therefore the box 9 can be separated from the main body 52 as shown in FIG. 18, where the identical parts as FIG. 14 are denoted by the same numerals.

The separated box 9 shown in FIG. 18 can be attached to the main body 52 if the above operation is executed in reverse.

In a state where the guide protrusion 65 is in contact with the end 62*b* of the guide groove 62 as shown in FIG. 15, the guide protrusion 65 is inserted in the guide protrusion supporting hole 67, by which the box 9 is supported at the main body 52, therefore if the operator supporting the box 9 by hand releases the box 9, the box 9 rotates downward with the guide protrusion 65 as the center due to its own weight.

Figure 19:
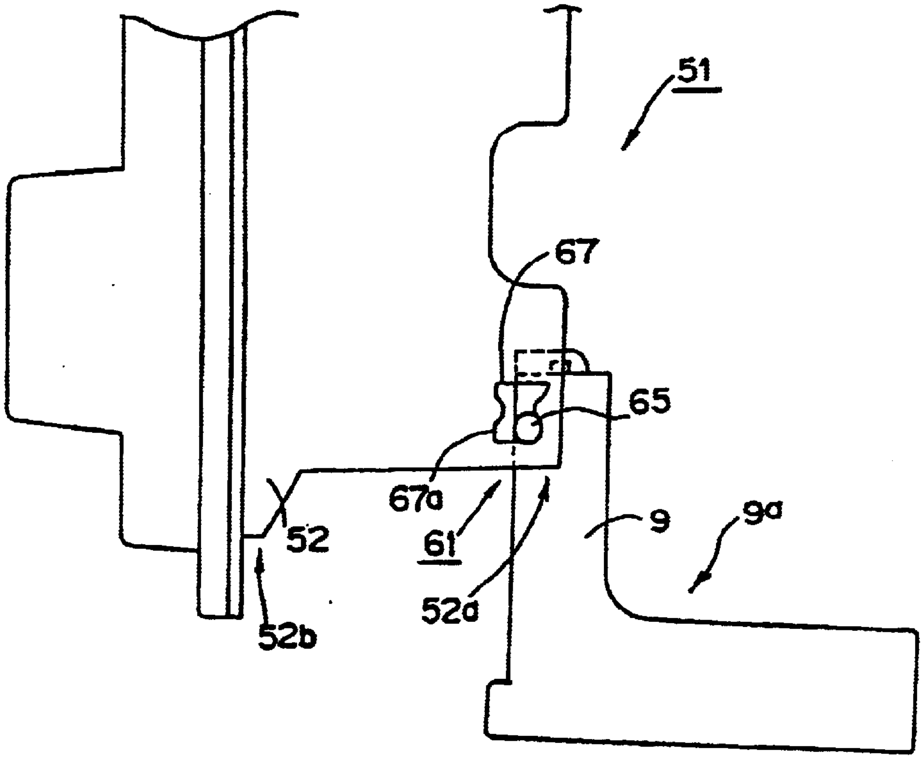
FIG. 19 is a conceptual plan view of a major portion depicting the attachment/removal operation of the box constituting the bank-note processing device in accordance with the present invention.

When the box 9 rotates for a predetermined angle, the base of the body of the box 9 disposed between the guide protrusion 65 contacts a notch, not illustrated, formed in the base of the main body 52, so as to control the rotation of the box 9, so the entire box 9 is supported at the main body 52 via the guide protrusion 65 and the guide support hole 67 as shown in FIG. 19, where the identical parts as FIG. 14 are denoted by the same numerals.

Since an open space is created in the upper part 9*a* of the box 9 supported at the main body 52, the maintenance, inspection and cleaning of the bank-note transporting means 11, the shutter means 18 or the bank-note identification means 19 can be performed using this space, and at that time, an operator need not hold the box 9, which improves work efficiency.

If the above operation is performed after the box 9 is returned from the state where the box 9 is supported at the main body 52 to the state shown in FIG. 15 by rotating the box 9 counterclockwise with the guide protrusion 65 as the center, then the box 9 can be separated from the main body 52.

As described above, in the bank-note processing device in accordance with the first aspect of the present invention, the bank-note reverse-flowing preventive lever comprises the first lever which is rotatably supported via the first shaft and is shorter than the outer diameter of the bank-note guide drum, the first urging means which constantly exerts force on the first lever toward the bank-note transfer passage side, the first stop which controls the first lever not to rotate more than at a predetermined rotation angle toward the bank-note transfer passage side, the second lever which is rotatably supported at the front end of the first lever via the second shaft, the second stop which controls the second lever not to rotate more than at a predetermined rotation angle toward the bank-note transfer passage side, and the second urging means which constantly exerts force on the second lever toward the bank-note transfer passage side, therefore at the initial position where the bank-note reverse-flowing preventive lever returns when the bank-note is stored in the stacker, the length of the portion sticking out through the hole toward the drums is longer compare with the prior art, and as a result, the bank-note stored in the stacker engages with the bank-note reverse-flowing preventive lever without fail, even if the inserted bank-note is a bank-note having a short longitudinal dimension. Also in the bank-note processing device in accordance with the first aspect of the present invention, the second lever is rotatably supported, via the second shaft, at the front end of the rotatable first lever, which is shorter than the outer diameter of the bank-note guide drums and on which force is constantly exerted toward the bank-note transfer passage side by the first urging means, and force is constantly exerted on the second lever toward the bank-note transfer passage by the second urging means, therefore the bottom end of the bank-note leaves from the second lever before the slits, which are shifted in parallel with the bank-note transfer passage, reaches the outer diameter of the bank-note guide drums by the rotary driving of the bank-note guide drum, that is, before the bank-note reaches the stacker, and as a result, the bottom end of the bank-note leaves the second lever and the bank-note reverse-flowing preventive lever returns to-the initial position without fail when the bank-note is stored in the stacker. As a consequence, the potential problem where the bank-note reverse-flowing preventive lever engages with the bottom end of the bank-note pressed by another bank-note stored in the stacker before and cannot return to the initial position can be prevented as much as possible.

Therefore, even when the inserted bank-note is a bank-note having a short longitudinal dimension, the bank-note can be engaged with the bank-note reverse-flowing preventive lever without fail when the bank-note is stored in the stacker, and the potential problem where the bank-note once stored in the stacker is pressed by another bank-note stored in the stacker before or by the stacker plate, not illustrated, and roughly the center in the width direction of the bank-note sticks out into the bank-note transfer passage interfering in transporting the bank-note to be stored next can be prevented as much as possible.

In other words, in the bank-note processing device in accordance with the first aspect of the present invention, when the bank-notes which longitudinal dimensions vary are stored in the stacker, the bank-note can be engaged with the bank-note reverse-flowing preventive lever without fail, and the potential problem where the bank-note once stored in the stacker sticks out into the bank-note transfer passage interfering in transporting the bank-note to be stored next can be prevented as much as possible.

Particularly, the bank-notes stored in the stacker 71 tend to swell toward the bank-note transfer passage side by air which enters into the center area in the width direction of the bank-notes therefore having this bank-note reverse-flowing preventive lever is effective to prevent the potential problems described above.

Also in the bank-note processing device in accordance with the second aspect of the present invention, the bank-note reverse-flowing preventive lever, which is disposed between the pair of bank-note guide drums when the stacker is attached to the main body so as to prevent the bank-notes stored in the stacker from sticking out into the bank-note transfer passage, is disposed in the stacker, so when the stacker is separated from the main body, this lever can prevent the bank-notes stored in the stacker from dropping, and as a result, a bank-note processing device which can prevent potential problems where the bank-notes stored in the stacker stick out into the bank-note transfer passage interfering in processing the bank-note to be transported next and can prevent bank-notes stored in the stacker from dropping when collecting bank-notes as much as possible.

In the bank-note processing device in accordance with the third aspect of the present invention, the attachment/removal means comprises a guide groove which is formed on both sides of the inner surface of the main body, a guide protrusion which is formed on both sides of the box and is guided into the guide groove, a guide protrusion escape hole which is formed just before the end of the guide groove directed upward of the guide groove, and a guide protrusion support hole which is formed on both sides of the main body and at the end of the guide groove, therefore the box is slidably attached to the main body when the guide protrusion is inserted in the guide groove via the guide protrusion escape hole, and is rotatably supported at the main body and the box is separated from the main body by removing the guide protrusion from the guide groove via the guide protrusion escape hole when the guide protrusion is inserted in the guide protrusion support hole, as a consequence, if the box rotates downward with the guide protrusion as the center due to its own weight in a state where the guide protrusion is in contact with the end of the guide groove, an open space is created at the upper part of the box.

If the maintenance, inspection and cleaning of the bank-note transporting means or bank-note identification means are performed using this space, the operator can perform these operations using both hands since it is not necessary to hold the box while performing these operations, which makes the operation simpler and improves work efficiency, and as a result, a bank-note processing device which simplifies maintenance, inspection and cleaning operations of various devices disposed on the bank-note transfer passage and improves work efficiency can be provided.

Industrial Applicability

The present invention is suitable for a bank-note processing device used for an automatic vending machine, a money changing machine, a pachinko ball dispenser and a metal token dispenser.

What is claimed is:

1. A bank-note processing device comprising:

a main body comprised of bank-note transporting means for guiding a bank-note inserted from a bank-note slot to a bank-note transfer passage, and bank-note identification means for judging the genuineness of the bank-note passed through the bank-note transporting means; and a box which constitutes a part of the bank-note transfer passage and is removably attached to the main body via attachment/removal means, characterized in that the removal means further comprises:

a guide groove which is formed on both sides of the inner surface of the main body;

a guide protrusion which is formed on both side faces of the box and is guided into the guide groove;

a guide protrusion escape hole which is formed just before the end of the guide groove directed to the upper part of the guide groove; and a guide protrusion support hole, which is formed on both side faces of the main body and at the end of the guide groove, where the box is slidably attached to the main body when the guide protrusions are inserted into the guide grooves via the guide protrusion escape holes, and is rotatably supported from the main body when the guide protrusions are inserted into the guide protrusion support holes, so that the box can be separated from the main body by escaping the guide protrusions from the guide grooves via the protrusion escape holes.

* * * * *